United States Patent
Tedder et al.

(10) Patent No.: US 12,459,960 B2
(45) Date of Patent: Nov. 4, 2025

(54) CARBONYLATION CATALYSTS AND METHODS OF MAKING THE SAME

(71) Applicant: Novomer, Inc., Rochester, NY (US)

(72) Inventors: Jonathan D. Tedder, Rochester, NY (US); Alison M. Wilders, Rochester, NY (US); Geoffrey W. Coates, Lansing, NY (US); Catherine A. Falkner, Rochester, NY (US)

(73) Assignee: Novomer, Inc., Rochester, NY (US)

( * ) Notice: Subject to any disclaimer, the term of this patent is extended or adjusted under 35 U.S.C. 154(b) by 0 days.

(21) Appl. No.: 18/285,803

(22) PCT Filed: Mar. 30, 2022

(86) PCT No.: PCT/US2022/022488
§ 371 (c)(1),
(2) Date: Oct. 5, 2023

(87) PCT Pub. No.: WO2022/216491
PCT Pub. Date: Oct. 13, 2022

(65) Prior Publication Data
US 2024/0368197 A1    Nov. 7, 2024

Related U.S. Application Data

(60) Provisional application No. 63/171,150, filed on Apr. 6, 2021.

(51) Int. Cl.
*C07F 5/06*    (2006.01)
(52) U.S. Cl.
CPC .................. *C07F 5/069* (2013.01)
(58) Field of Classification Search
CPC .. B01J 2531/31; B01J 2531/845; B01J 31/20; C07F 5/069
See application file for complete search history.

(56) References Cited

U.S. PATENT DOCUMENTS

| | | |
|---|---|---|
| 6,852,865 B2 | 2/2005 | Coates et al. |
| 8,481,756 B1 * | 7/2013 | Coates ............... C07D 307/60 549/233 |
| 8,633,123 B2 | 1/2014 | Allen et al. |

FOREIGN PATENT DOCUMENTS

| | | |
|---|---|---|
| CN | 112142775 A | 12/2020 |
| WO | 03050154 A2 | 6/2003 |
| WO | 2010022388 A2 | 2/2010 |

OTHER PUBLICATIONS

Feng, Maoqi et al., "Synthesis and Reactivity of Nonbridged Metal—Metal Bonded Rhodium and Iridium Phenanthroline-Based N2O2 Dimers", Organometallics 2002, 21, 2743-2750 (8 pages).
International Preliminary Report on Patentability issued in co-pending Application No. PCT/US2022/022488 dated May 19, 2023 (6 pages).
International Search Report and Written Opinion issued in co-pending Application No. PCT/US2022/022488 mailed Jul. 22, 2022 (12 pages).
Miyata, Atsushi et al., "Catalytic aerobic oxidation of diols under photo-irradiation: highly efficient synthesis of lactols", Tetrahedron Letters 43 (2002) 3481-3484 (24 pages).
Normand, Adrien T. et al., "Phosphasalen group IV metal complexes: synthesis, characterization and ring opening polymerization of lactide", Dalton Transactions, 2020, 49, 6989 (28 pages).
Second Written Opinion of the International Preliminary Examining Authority issued in co-pending Application No. PCT/US2022/022488 mailed Mar. 14, 2023 (6 pages).

* cited by examiner

*Primary Examiner* — Pancham Bakshi
(74) *Attorney, Agent, or Firm* — Young Basile Hanlon & MacFarlane, P.C.

(57) ABSTRACT

Disclosed herein are compounds and methods useful as carbonylation catalysts that improve steric properties so that reaction with epoxide is improved, reaction with lactones is avoided, and polymer bonds to the metal centers are weakened, which facilitates faster ring closure, that improve stability of the carbonylation catalyst by not being susceptible to hydrolysis, which reduces side products and improves recovery yields of the carbonylation catalyst after using to make lactones, and that have improved steric and electron properties so that release time of a lactone product is minimized, which reduces side reactions.

16 Claims, 5 Drawing Sheets

CARBONYLATION CATALYSTS AND METHODS OF MAKING THE SAME

The present application is the United States National Stage of International Application No. PCT/US2022/022488 which was filed on Mar. 30, 2022 and published as WO2022216491, which claims the benefit of U.S. Provisional Application 63/171,150 filed on Apr. 6, 2021. The entire contents of these applications are incorporated herein by reference in their entirety.

FIELD

The present disclosure relates to novel catalyst used in the production of lactones from epoxides and methods of making the same.

BACKGROUND

Carbonylation is a process that can be used to react carbon monoxide and an epoxide to make a lactone. In some cases, additional steps are taken to react the lactones to make polymers. These lactones or polymers thereof are often used as plastics and disinfectants. When making these lactones, a carbonylation catalyst is used to optimize the efficiency of the reaction to produce lactones at competitive prices. Carbonylation catalysts are expensive, and thus, new carbonylation catalysts and new techniques to synthesize the carbonylation catalysts from simple components are needed. Further, some current carbonylation catalysts can create unwanted side products that need to be later filtered out. Some carbonylation catalysts can be found in US Patent Nos. U.S. Pat. Nos. 6,852,865, 8,481,756, and 8,633,123. Some of these carbonylation catalysts may provide slow reaction times, can become unstable, and can deactivate during the course of the catalytic carbonylation.

Accordingly, a catalyst is needed that can be used in a carbonylation reaction and that can be recycled, possesses a longer catalytic lifetime, has an increased rate of formation of lactone product, and/or avoid undesirable side products.

SUMMARY

Disclosed are compounds that have catalytic activity with one or more of an epoxide, succinic anhydride, or a lactone according to one of the following formulas:

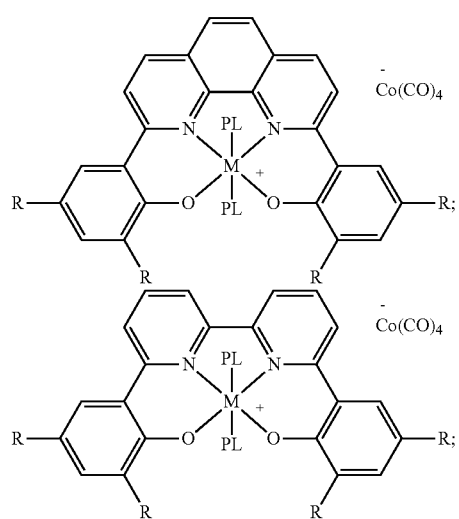

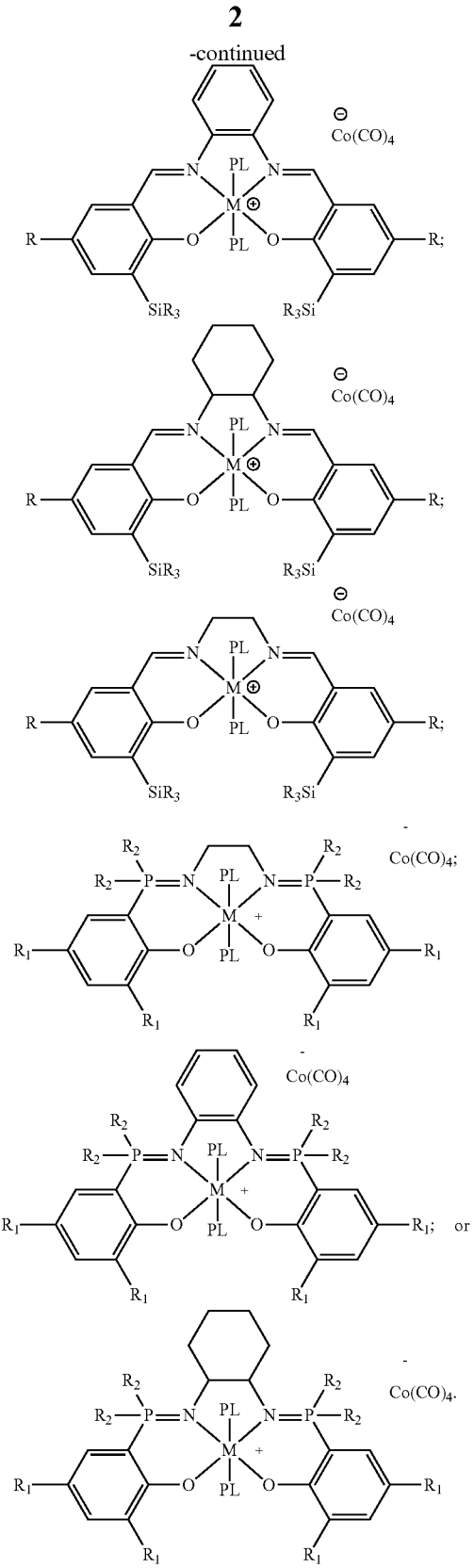

In these compounds, R is separately in each occurrence an hydrogen, alkyl, or aryl group; $R_1$ is separately in each occurrence hydrogen, alkyl, or aryl groups; $R_2$ is separately in each occurrence an alkyl, aryl, or alkoxide group; $R_3$ is separately in each occurrence an alkyl or aryl group; $R_4$ may be separately in each occurrence an alkyl group or a halogen; PL is the residue of a polar ligand; and M is separately in each occurrence a Lewis Acid metal.

Disclosed herein are methods for preparing the above compounds by contacting a compound according to one of the following formulas:

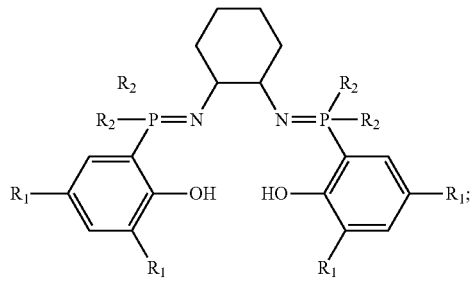

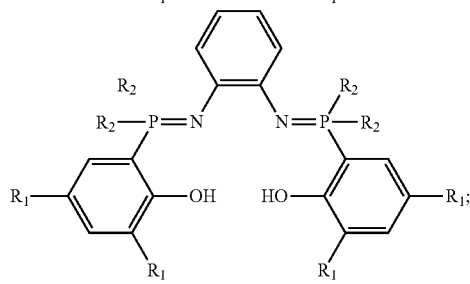

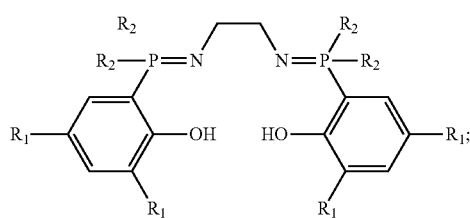

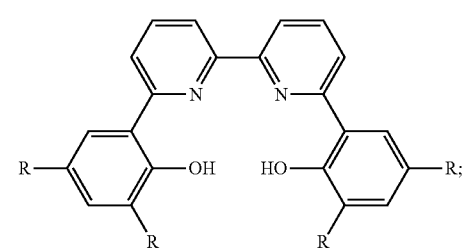

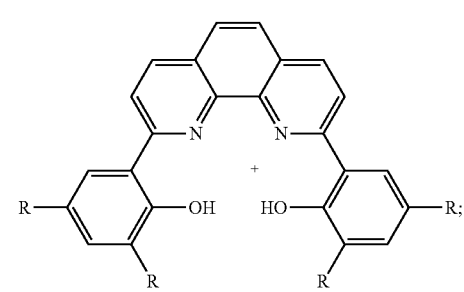

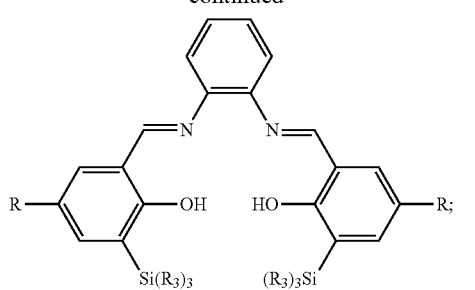

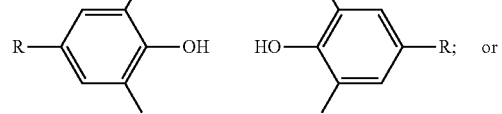

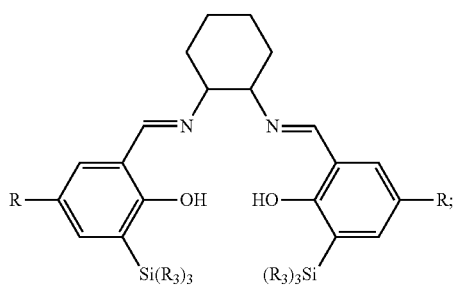

with a metalating agent to form one of the compounds according to the following formula

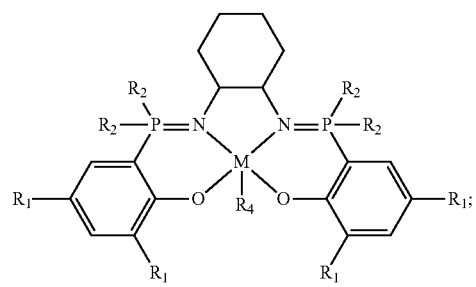

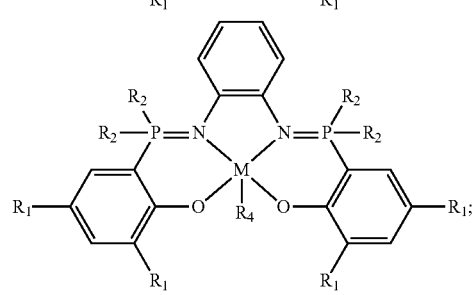

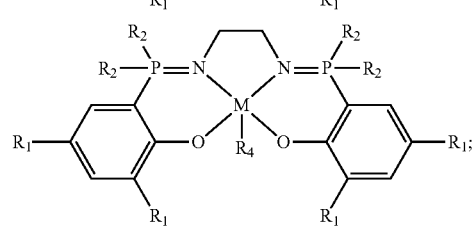

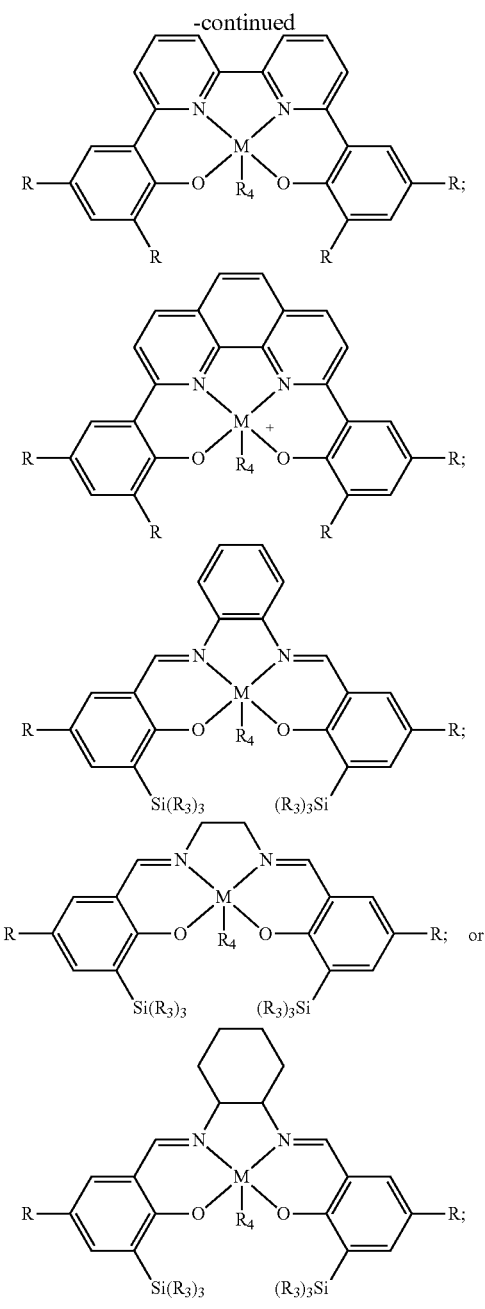
and contacting the formed compounds with a metal carbonyl under condition such that one of the following compounds are formed:
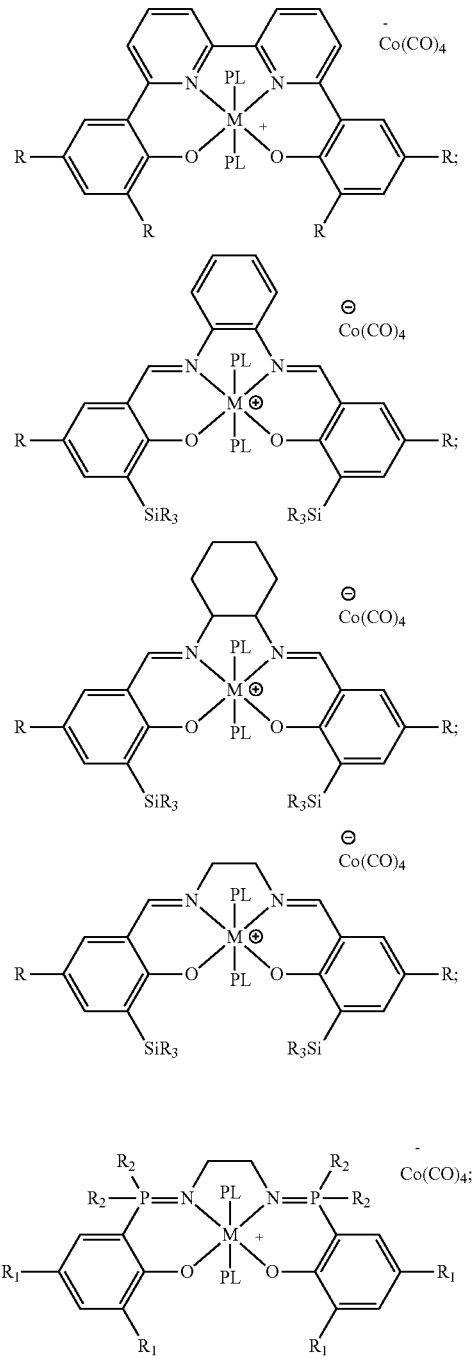

-continued

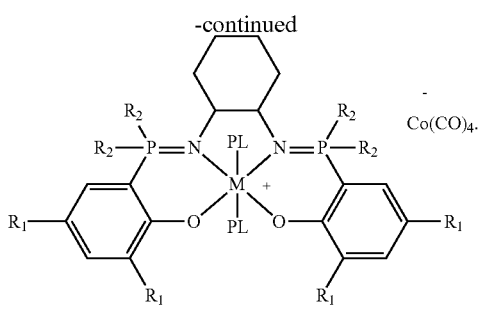

where R, $R_1$, $R_2$, $R_3$, $R_4$, PL, and M are described above. The methods may further include contacting the formed compounds, the metal carbonyl, or both with a polar ligand so that that one of the compounds are formed.

Disclosed herein are methods of preparing one of the compounds according to the one of the following formulas:

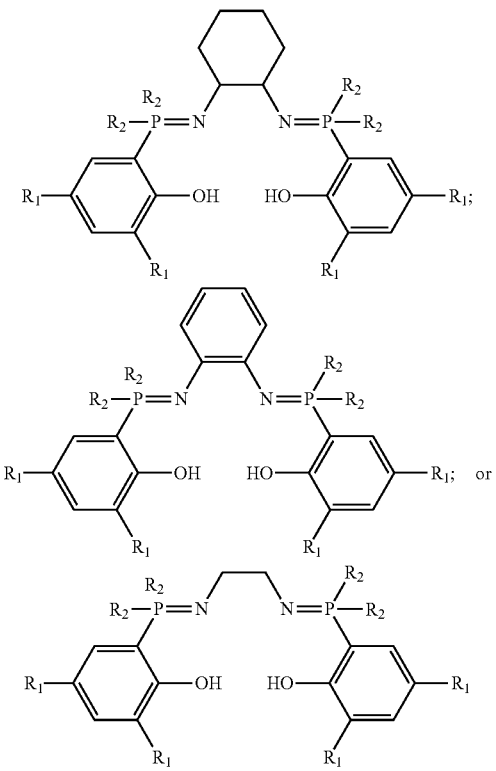

by contacting a phenol which may be substituted at the 2 and/or 4 position with a hydrogen, alkyl, or aryl group with a halogenating agent under conditions such that a halogen atom is added at the 6 carbon atom to form a halogenated phenol. The method further includes contacting the halogenated phenol with a halo-di(aryl or alkyl) phosphine in the presence of an alkyl lithium under conditions to replace the halogen on the phenol with di(alkyl or aryl) phosphate to form a dialkyl or diaryl phosphate substituted phenol. The method further includes contacting the dialkyl or diaryl phosphate substituted phenol with a diamine, an ortho phenylene amine or ortho cyclohexyl diamine in the presence of a source of bromine and a trialkyl amine to form a compound according to the formulas. The method may further include, first, contacting the dialkyl or diaryl phosphate substituted phenol with the source of bromine to form an activated dialkyl or diaryl phosphate substituted phenol, and second, contacting the activated dialkyl or diaryl phosphate substituted phenol with the ethylene diamine, ortho phenylene amine, or the cyclohexyl diamine in the presence of the trialkyl amine to form the compound according to the formulas.

Disclosed herein are methods for preparing one of the compounds according to one of the following formulas:

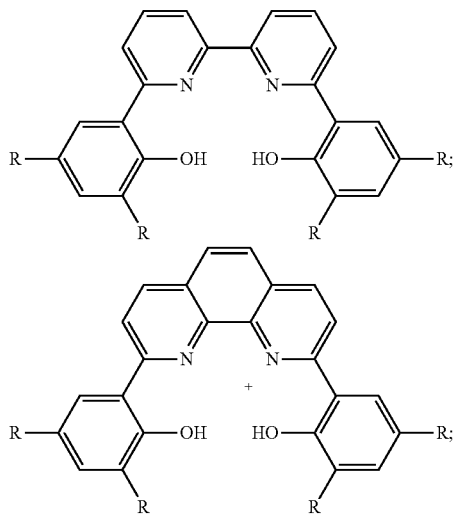

by:
by contacting a phenol which may be substituted at the 2 and/or 4 position with a hydrogen, alkyl, or aryl group with a halogenating agent under conditions such that a halogen atom is added at the 6 carbon atom to form a halogenated phenol. The method further includes contacting the formed halogenated phenol with a trialkyl borate in the presence of an alkyl lithium compound to replace the halogen atom with a boron dihydroxide group. The method further includes contacting phenol containing a boron dihydroxide group with bipyridine or phenanthroline having halogen groups on carbons adjacent to the nitrogen atoms in the presence of a palladium catalyst and an alkali metal carbonate under conditions to form one of the compounds of the formulas. The trialkyl amine may consume bromic acid to form an ammonium salt. The method may further include contacting the phenol containing a boron dihydroxide group with hydrochloric acid to quench the reaction.

Disclosed herein are methods of preparing one of the compounds according to one of the following formulas:

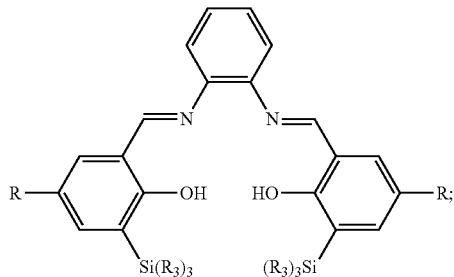

-continued

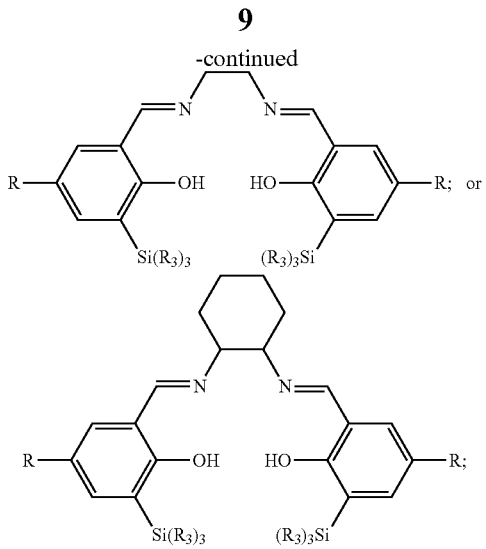

by contacting a phenol which may optionally be substituted at the 4 position with an hydrogen, alkyl, or aryl group with a halogenating agent and silyl halide under conditions such that a halogen atom is added at the 2 and 6 carbon atoms of the aromatic ring and the 1 hydroxyl group is converted to silyl ether group which may optionally be substituted at the 4 position with an hydrogen, alkyl, or aryl group. The method further includes contacting the formed 2, 6-halogenated 1-silylether substituted benzene with an alkyl lithium compound and dimethylformamide to form a phenol having a silyl and an acetaldehyde group at the 2 and 6 positions which may optionally be substituted at the 4 position with a hydrogen, alkyl, or aryl group. The method further includes contacting the phenol having a silyl and an acetaldehyde group at the 2 and 6 positions which may optionally be substituted at the 4 position with a hydrogen, alkyl, or aryl group with one of o-phenylene diamine, ethylene diamine, or cyclohexanediamine and optionally in the presence of a Lewis acid or Bronsted acid catalyst and an alkali metal or ammonium salt form one of the compounds corresponding to one of the formulas. The method may further include first contacting the phenol which may optionally be substituted with the halogenating agent to form a halogenated phenol, and second, contacting the halogenated phenol with the silyl halide under conditions such that 1 hydroxyl group is converted to silyl ether group which may optionally be substituted at the 4 position with an hydrogen, alkyl, or aryl group. The method may further include contacting the halogenated phenol and the silyl halide with a tertiary amine to consume any acid byproduct so that the phenol having a silyl and an acetaldehyde group at the 2 and 6 positions which may optionally be substituted at the 4 position with a hydrogen, alkyl, or aryl group is formed. The method may further include first contacting the formed 2, 6-halogenated 1-silylether substituted benzene with the alkyl lithium compound to form the phenol having the silyl at the 2 or 6 position, and second, contacting the phenol having the silyl at the 2 or the 6 position with dimethylformamide to form the phenol having the silyl and the acetaldehyde group at the 2 and 6 positions which may optionally be substituted at the 4 position with a hydrogen, alkyl, or aryl group.

The present disclosure provides carbonylation catalysts containing phosphasalen, phosphasalph, phosphasalcy ligands, 6,6'-di(3,5-disubstituted-2-hydroxybenzene)-2,2'-bipyridine ("$^R$dhbpy(H)$_2$" where R is in each occurrence hydrogen, alkyl, or aryl) or 6,6'-di(3,5-disubstituted-2-hydroxybenzene)-2,2'-phenanthroline ("$^R$dhphen(H)$_2$" where R is in each occurrence hydrogen, alkyl, or aryl) ligands, and/or silyl substituted salen, salph or salcy ligands that possess catalytic activity with one or more of ethylene oxide, betapropiolactone, and/or succinic anhydride. The present disclosure provides carbonylation catalysts containing phosphasalen, phosphasalph, phosphasalcy ligands, $^R$dhbpy(H)$_2$ or $^R$dhphen(H)$_2$ ligands, and/or silyl substituted salen, salph or salcy ligands that have improved steric and electron qualities which improve reaction yields, reduce time of reaction, reduce side products, increase catalyst longevity, increase catalyst stability and are more easily recoverable after a carbonylation reaction.

BRIEF DESCRIPTION

DETAILED DESCRIPTION

Figure 1:
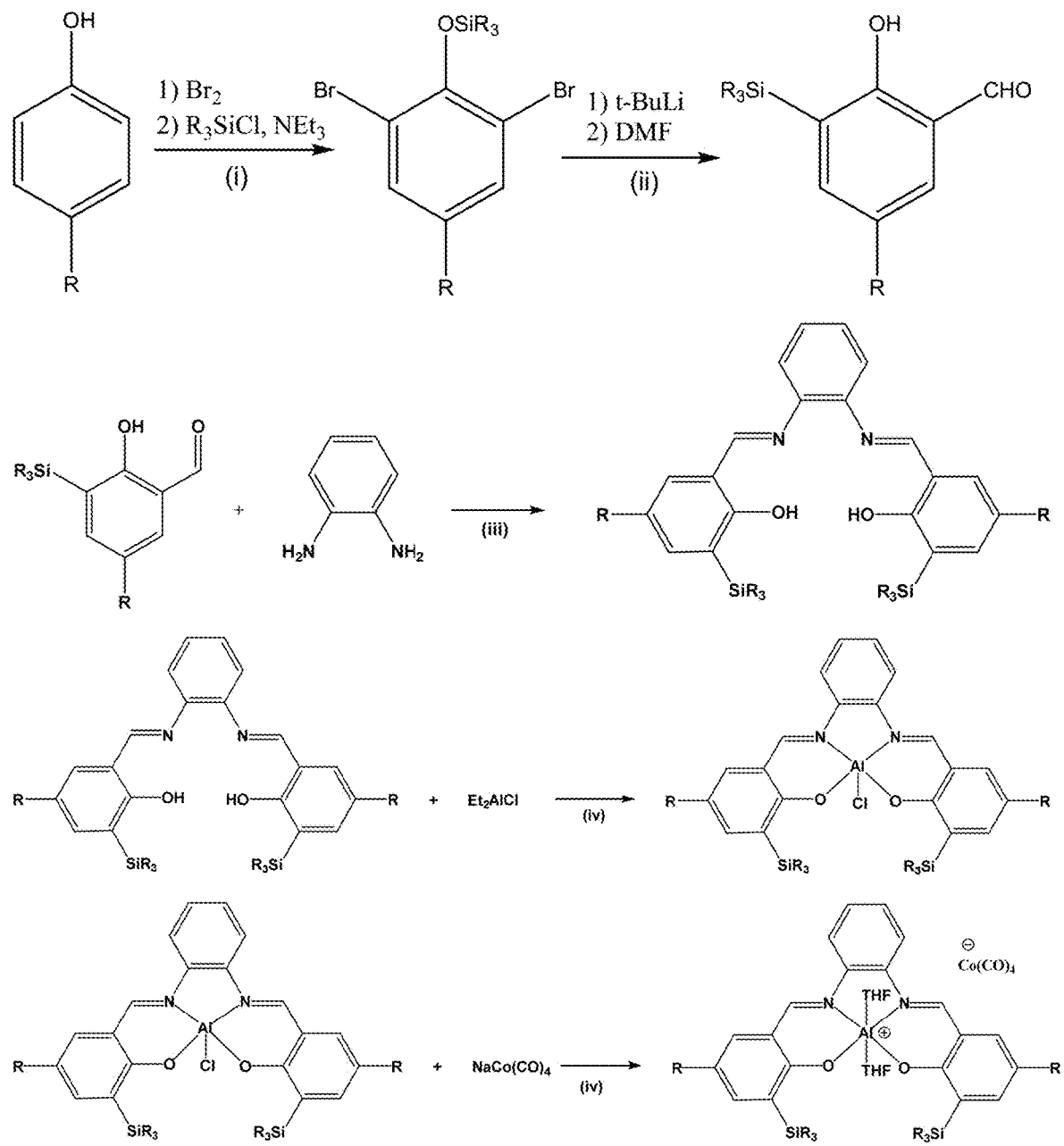
FIG. 1 is a synthetic scheme to form a carbonylation catalyst with a Lewis acid containing a silyl substituted salen, salph or salcy ligands.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

One or more as used herein means that at least one, or more than one, of the recited components may be used as disclosed. Residue with respect to an ingredient or reactant used to prepare the polymers or structures disclosed herein means that portion of the ingredient that remains in the polymers or structures after inclusion as a result of the methods disclosed herein. Substantially all as used herein means that greater than 90 percent of the referenced parameter, composition, structure or compound meet the defined criteria, greater than 95 percent, greater than 99 percent of the referenced parameter, composition or compound meet the defined criteria, or greater than 99.5 percent of the referenced parameter, composition or compound meet the defined criteria. Portion as used herein means less than the full amount or quantity of the component in the composition, stream, or both. Precipitate as used herein means a solid compound in a slurry or blend of liquid and solid compounds. Phase as used herein means a solid precipitate or a liquid or gaseous distinct and homogeneous state of a system with no visible boundary separating the phase into parts. Parts per weight means parts of a component relative to the total weight of the overall composition. A catalyst component as used herein means a metal centered compound, a metal carbonyl, a Lewis acid, a Lewis acid derivative, a metal carbonyl derivative, or any combination thereof. A catalyst as used herein includes at least cationic compound and an anionic compound. An organic compound as used herein includes any compound that is free of a metal atom. An inorganic compound as used herein includes compounds that include at least one metal atom. Composition as used herein includes all components in a stream, reactant stream, product stream, slurry, precipitate, liquid, solid, gas, or any combination thereof that are containable within a single vessel.

Disclosed herein are compounds and methods useful as carbonylation catalysts that improve steric properties so that reaction with epoxide is improved, reaction with lactones is avoided, and the polymer bonds to the metal centers are weakened, which facilitates faster ring closure and improves stability of the carbonylation catalyst by not being susceptible to hydrolysis. This provides an advantage of reduced side products, improved recovery yields of the carbonylation catalyst after using to make lactones, and improved steric and electron properties so that release time of a lactone product is minimized, which reduces side reactions.

The carbonylation catalysts may include a Lewis acid containing phosphasalen, phosphasalph, or phosphasalcy ligands, $^R$dhbpy(H)$_2$ or $^R$dhphen(H)$_2$ ligands, silyl substituted salen, salph, or salcy ligands and may function to catalyze the carbonylation reactions where an epoxide and carbon monoxide react to form one or more lactones described herein. The carbonylation catalysts described herein may also be used to react an aziridine and carbon monoxide to form a lactam.

The phosphasalen, phosphasalph, or phosphasalcy ligands ligand may have the following structure according to Compounds 1, 2, and/or 3:

Compound 1

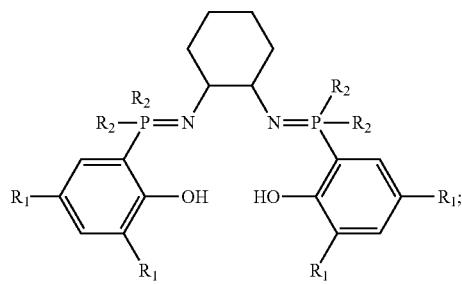

Compound 2

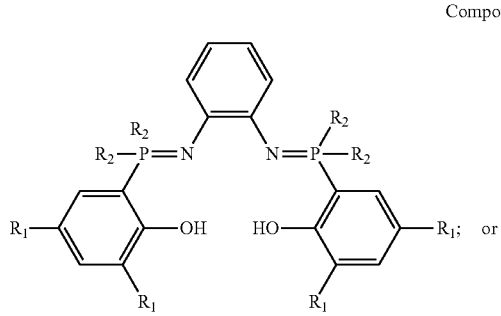

Compound 3

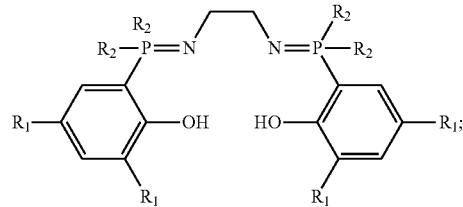

wherein R$_1$ may separately in each occurrence be hydrogen, alkyl or aryl, group; and wherein R$_2$ may separately in each be occurrence an alkyl, aryl, or alkoxide group.

After a metalation step described below, as Lewis acid precursor containing the phosphasalen, phosphasalph, or phosphasalcy ligands is formed, which may have the following structure according to Compounds 4, 5, and/or 6:

Compound 4

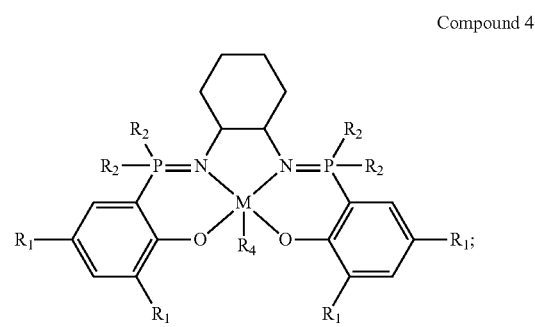

Compound 5

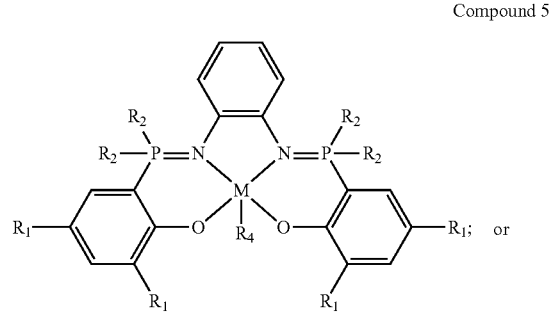

Compound 6

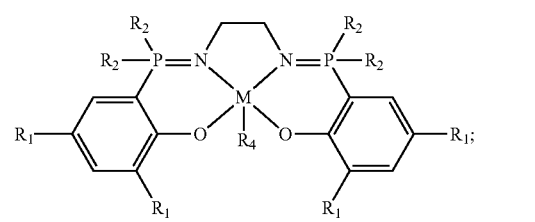

wherein R$_1$ and R$_2$ are described in Compounds 1, 2, and 3; wherein R$_4$ may be separately in each occurrence an alkyl group or a halogen; and wherein M may be separately in each occurrence a Lewis Acid metal.

To form the carbonylation catalyst, the Lewis acid precursor containing the phosphasalen, phosphasalph, or phosphasalcy ligands is reacted with a metal carbonyl additive, as described below. The final carbonylation catalyst having a Lewis acid precursor containing phosphasalen, phosphasalph, or phosphasalcy may have the following structure according to compounds 7, 8, and/or 9:

Compound 7

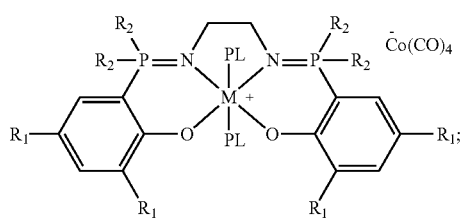

Compound 8

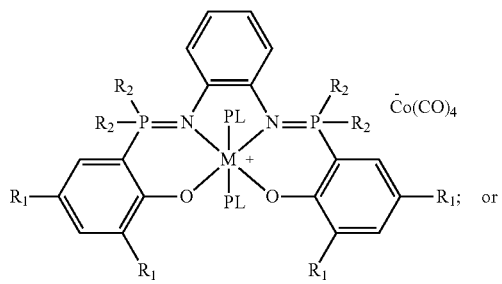

Compound 9

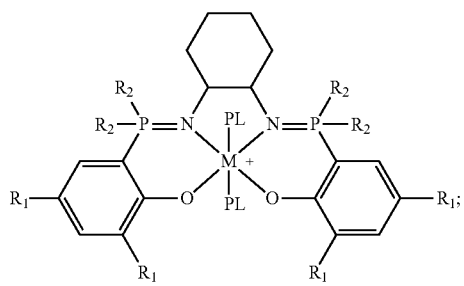

wherein $R_1$, $R_2$, and M are described in relation to compounds 1 to 6; and wherein PL may be the residue of a polar ligand, such as diethyl ether, dioxane, or tetrahydrofuran.

The $^R$dhbpy(H)$_2$ or $^R$dhphen(H)$_2$ ligands may have the following structure according to compounds 10 and/or 11:

Compound 10

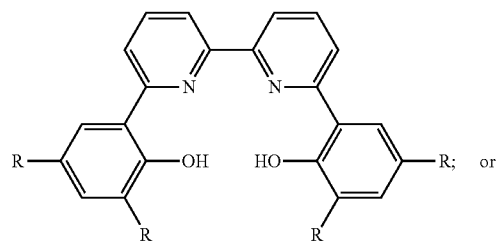

Compound 11

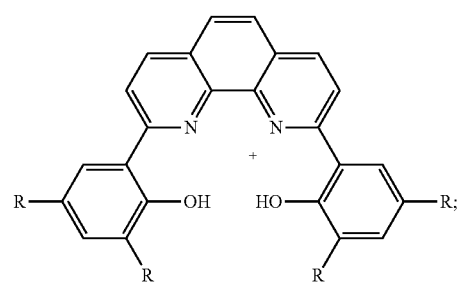

wherein R is separately in each occurrence an hydrogen, alkyl, or aryl group.

After a metalation step described below, as Lewis acid precursor containing the $^R$dhbpy(H)$_2$ or $^R$dhphen(H)$_2$ ligands is formed, which may have the following structure according to compounds 12 and/or 13:

Compound 12

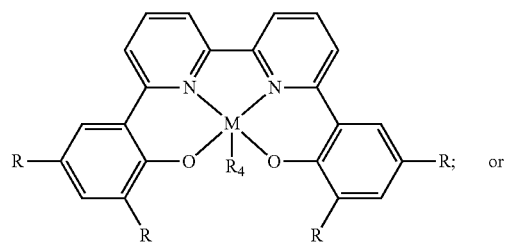

Compound 13

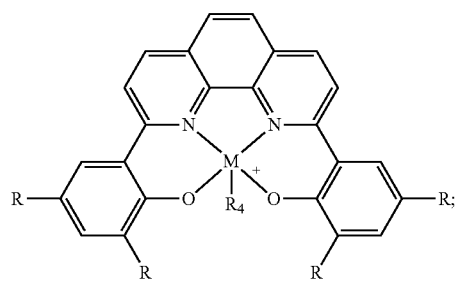

wherein R, M, and $R_4$ are described in relation to compounds 1-11.

To form the carbonylation catalyst, the Lewis acid precursor containing the $^R$dhbpy(H)$_2$ or $^R$dhphen(H)$_2$ ligands is reacted with a metal carbonyl additive, as described below. The final carbonylation catalyst having a Lewis acid precursor containing the $^R$dhbpy(H)$_2$ or $^R$dhphen(H)$_2$ ligand may have the following structure according to compounds 14 and/or 15:

Compound 14

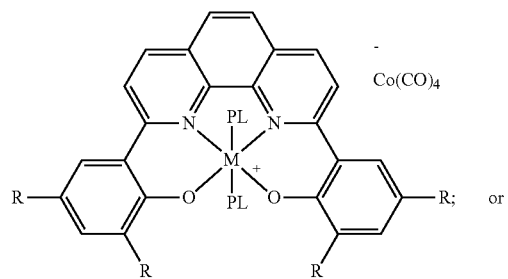

Compound 15

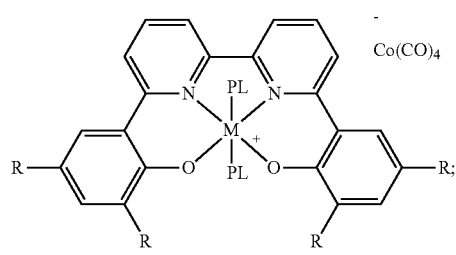

wherein R, M, and PL are described in relation to compounds 1-13.

The silyl substituted salen, salph, or salcy ligand may have the following structure according to compounds 16, 17, and/or 18:

Compound 16

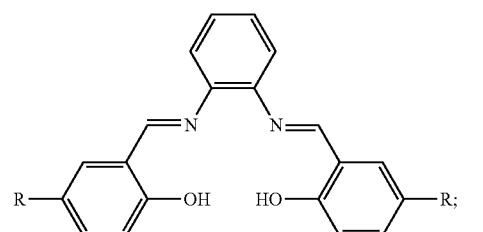

Compound 17

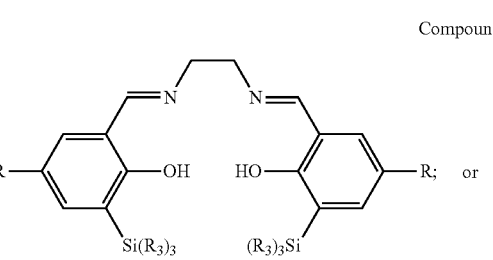

Compound 18

wherein R is described in compounds 1-15; and wherein $R_3$ may be separately in each occurrence an alkyl or aryl group After a metalation step described below, as Lewis acid precursor containing the silyl substituted salen, salph, or salcy ligand is formed, which may have the following structure according to compounds 19, 20, and/or 21:

Compound 19

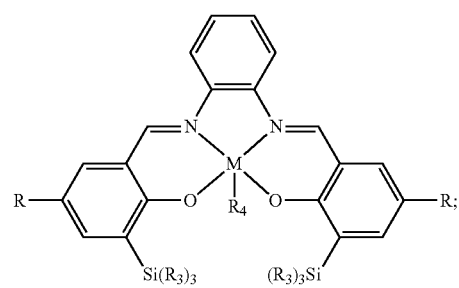

Compound 20

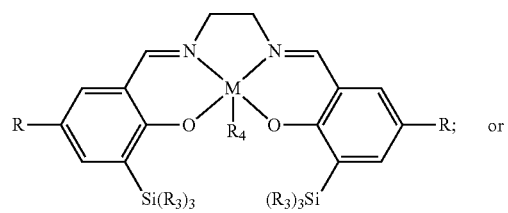

Compound 21

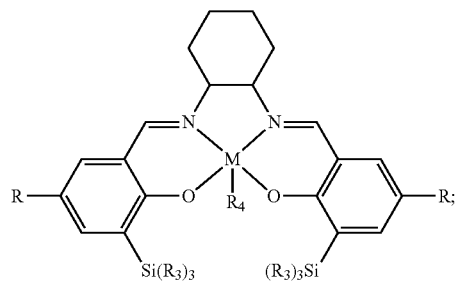

wherein R, $R_3$, $R_4$, and M are described in relation to compounds 1-18.

To form the carbonylation catalyst, the Lewis acid precursor containing the silyl substituted salen, salph, or salcy ligand is reacted with a metal carbonyl additive, as described below. The final carbonylation catalyst having a Lewis acid precursor containing the silyl substituted salen, salph, or salcy ligand may have the following structure according to compounds 22, 23, and/or 24:

Compound 22

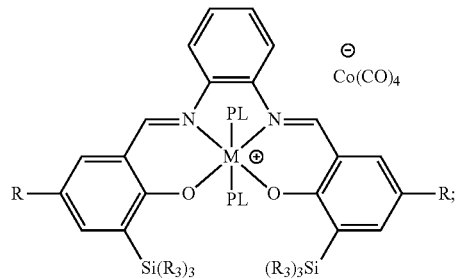

Compound 23

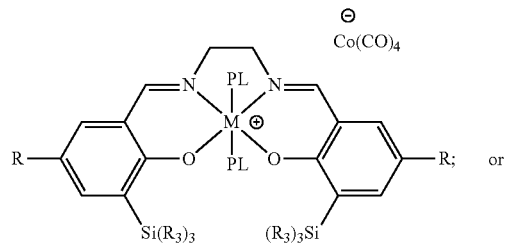

Compound 24

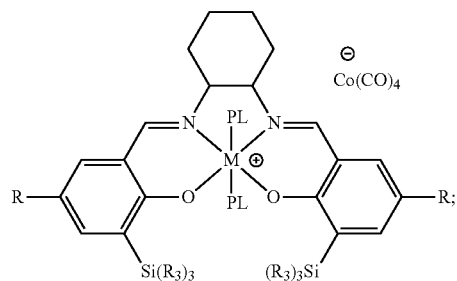

wherein R, R₃, M, and PL are described in relation to compounds 1-21.

The carbonylation reaction may include contacting one or more epoxides, lactones, or both with carbon monoxide in the presence of catalyst. This step may occur in a reactor that has one or more inlets, two or more inlets, three or more inlets, or a plurality of inlets. The one or more epoxides, the lactones, the carbon monoxide, and the catalyst may be added in a single inlet, multiple inlets, or each may be added in a separate inlet as separate or combined feed streams. The carbonylation reaction may produce one or more product streams or compositions.

The epoxide used in the carbonylation reaction may be any cyclic alkoxide containing at least two carbon atoms and one oxygen atom. For example, the epoxide may have a structure shown by formula (I):

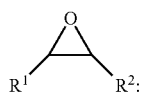

Formula (I)

where $R^1$ and $R^2$ in the context of formula (I) are each independently selected from the group consisting of: hydrogen; $C_1$-$C_{15}$ alkyl groups; halogenated alkyl chains; phenyl groups; optionally substituted aliphatic or aromatic alkyl groups; optionally substituted phenyl; optionally substituted heteroaliphatic alkyl groups; optionally substituted 3 to 6 membered carbocycle; and optionally substituted 3 to 6 membered heterocycle groups, where $R^1$ and $R^2$ can optionally be taken together with intervening atoms to form a 3 to 10 membered, substituted or unsubstituted ring optionally containing one or more hetero atoms; or any combination thereof.

The lactone formed from the carbonylation reaction may be any cyclic carboxylic ester having at least one carbon atom and two oxygen atoms. For example, the lactone may be an acetolactone, a propiolactone, a butyrolactone, a valerolactone, caprolactone, or a combination thereof. Anywhere in this application where a propiolactone or lactone is used or described, another lactone may be applicable or usable in the process, step, or method. Where a propiolactone is a used or produced in the carbonylation reaction, the propiolactone may have a structure corresponding to formula (II):

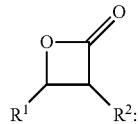

Formula (II)

where $R^1$ and $R^2$ in the context of formula (II) are each independently selected from the group consisting of: hydrogen; $C_1$-$C_{15}$ alkyl groups; halogenated alkyl chains; phenyl groups; optionally substituted aliphatic or aromatic alkyl groups; optionally substituted phenyl; optionally substituted heteroaliphatic alkyl groups; optionally substituted 3 to 6 membered carbocycle; and optionally substituted 3 to 6 membered heterocycle groups, where $R^1$ and $R^2$ can optionally be taken together with intervening atoms to form a 3 to 10 membered, substituted or unsubstituted ring optionally containing one or more hetero atoms; or any combination thereof.

The product stream or composition may include one or more organic compounds including a propiolactone, a polypropiolactone, succinic anhydride, polyethylene glycol, poly-3-hydroxypropionate, 3-hydroxy propionic acid, 3-hydroxy propionaldehyde, a polyester, a polyethylene, a polyether, unreacted epoxides, any derivative thereof, any other monomer or polymer derived from the reaction of an epoxide and carbon monoxide, or any combination thereof. The product stream or composition may include one or more inorganic compounds that include catalyst components such as metal carbonyls, metal carbonyl derivatives, metal centered compounds, Lewis acids, Lewis acid derivatives, or any combination thereof. A metal carbonyl derivative is a compound that includes one or more metals and one or more carbonyl groups that can be processed to form an anionic metal carbonyl component for use in a carbonylation catalyst. A Lewis acid derivative is a compound that includes one or more metal centered Lewis acids bonded to one or more undesirable compounds at the metal center that can be processed into a cationic Lewis acid for use in a carbonylation catalyst. The product stream or composition may include a catalyst that has not been spent or used up in the process of forming propiolactones. The product stream or composition may include one or more unreacted epoxides or carbon monoxide.

To make the carbonylation catalysts described herein, a phenol may be halogenated to form the basis of the Lewis acid of the carbonylation catalyst in a halogenation step. The phenol may be contacted with a polar solvent a halogenating agent under conditions such that a halogen atom is added at the 4 and/or 6 carbon atom to form a halogenated phenol. The phenol and the halogenating agent may be added in a molar ratio of about 1:1 or more, about 2:3 or more, or about 1:2 or more. The phenol may be substituted at the 2 and/or 4 position with a hydrogen, alkyl, or aryl group. The halogenation step may be performed in a polar solvent that is aprotic or protic depending on halogenating agent and the substituted groups of the phenol. The halogenation step may be performed at room temperature and in ambient air. After mixing the phenol and the halogenating agent, the halogenation reaction may be stirred through a known means, such as with a magnetic stir bar. The halogenation reaction may be stirred for about 1 hour or more, about 1.5 hours or more or more, or about 2 hours or more. The halogenation reaction may be stirred for about 3.5 hours or less, about 3 hours or less, or about 2.5 hours or less. The reaction may be quenched, for example, by addition of sodium bicarbonate, which causes the aqueous and organic layers to separate. The halogenated phenol may be isolated using any technique described herein or any known technique. For example, the halogenated phenol may be isolated using simple organic/aqueous extraction to remove aqueous layers, and the organic layers can be dried by adding $MgSO_4$ or $Na_2SO_4$, stirring with basic alumina, and then filtering over a combination of silica gel and diatomaceous earth.

After making and isolating the halogenated phenol, the halogenated phenol may be further modified with a silyl group in silylation step. The halogenated phenol may be contacted with a polar aprotic solvent and a silyl halide under such conditions such that the 1 hydroxyl group of the halogenated phenol is converted to a silyl ether group to form a 2, 6-halogenated 1-silylether substituted benzene. The halogenated phenol and the silyl halide may be added in a molar ratio of about 1:1. This silylation step may be performed in the presence of a catalyst that functions to facilitate conversion of the hydroxyl group to a silyl ether group. This silylation step may be performed in the presence of a scavenger that may consume any acid formed during the conversion of the hydroxyl to the silyl ether. The scavenger may include one or more of a tertiary amine. The scavenger may include one or more of triethylamine. The scavenger and the halogenated phenol may be added in a molar ratio of about 1:1, about 1.1:1, or about 1.2:1. Before addition of the silyl halide, the aprotic solvent and the halogenated phenol may be cooled to about −10 degrees Celsius or more, about −5 degrees Celsius of more, or about 0 degrees Celsius or more. The aprotic solvent and the halogenated phenol may be cooled to about 15 degrees Celsius or less, about 10 degrees Celsius or less, or about 5 degrees Celsius or less. After addition of the silyl halide, the silylation step then may be allowed to warm to room temperature and stirred. After addition of the ingredients, the silylation step may be stirred for about 3 hours or less, about 2.5 hours or less, or about 2.0 hours or less at room temperature. The silylation step may be stirred for about 0.5 hours or more, about 1.0 hours or more, or about 1.5 hours or more at room temperature. After stirring, the 2, 6-halogenated 1-silylether substituted benzene may be isolated using any known means or any means discussed herein. For example, the solvent may be removed by vacuum filtration, the remaining product stream may be dissolved in a nonpolar solvent, the product stream may be filtered over a filtration bed, such diatomaceous earth, and remove the nonpolar solvent by vacuum filtration.

After making and isolating the halogenated phenol, the halogenated phenol may be subjected to an elimination step to replace the halogen atom on the phenol with a di(aryl or alkyl) phosphate. The halogenated phenol may be contacted with an alkyl lithium compound and a halo-di(aryl or alkyl) phosphine in a polar aprotic solvent to form a dialkyl or diaryl phosphate substituted phenol. The halogenated phenol and the halo-di(aryl or alkyl) phosphine may be added in a molar ratio of about 1:1 or more. The alkyl lithium may be added in an amount sufficient to replace the halogen atom on the phenol. First, the halogenated phenol may be dissolved in the polar aprotic solvent and cooled to about 90 degrees Celsius or less, about 85 degrees Celsius or less, or about 80 degrees Celsius or less. The polar aprotic solvent and the halogenated phenol may be cooled to about 65 degrees Celsius or more, about 70 degrees Celsius or more, or about 75 degrees Celsius or more. After cooling, the halogenated phenol may be contacted with the alkyl lithium compound in the polar aprotic solvent to form an intermediate composition. The intermediate composition may be allowed to warm to about room temperature (i.e., about 25 degrees Celsius) and may be stirred for about stirred for about 0.5 hours or more, about 0.75 hours or more, or about 1.0 hour or more. The intermediate composition may be stirred for about 2.25 hours or less, about 1.75 hours or less, or about 1.25 hours or less.

After stirring and before addition of the halo-di(aryl or alkyl) phosphine, the intermediate composition including the halogenated phenol, the alkyl lithium compound, or residues thereof in the polar aprotic solvent may be cooled to about 90 degrees Celsius or less, about 85 degrees Celsius or less, or about 80 degrees Celsius or less. The intermediate composition may be cooled to about 65 degrees Celsius or more, about 70 degrees Celsius or more, or about 75 degrees Celsius or more. After cooling and without isolating any compound within the intermediate composition, the intermediate composition including the halogenated phenol, the alkyl lithium compound, or residues thereof in the polar aprotic solvent may be contacted with the halo-di(aryl or alkyl) phosphine to form the dialkyl or diaryl phosphate substituted phenol in a product composition. After contacting with the halo-di(aryl or alkyl) phosphine, the product composition may be allowed to warm to about room temperature (i.e., about 25 degrees Celsius) and may be stirred for about 0.5 hours or more, about 1.0 hours or more, or about 1.5 hours or more. The product composition may be stirred for about 3.0 hours or less, about 2.5 hours or less, or about 2.0 hours or less. The product composition may be washed with a buffer solution to and the organic phase may be removed by any means discussed herein or known by the skilled artisan, such as organic/aqueous extraction. The buffer solution may be potassium phosphate. Accordingly, the dialkyl or diaryl phosphate substituted phenol may be removed or isolated from the product stream by any other known isolation or extraction means. The elimination step may be performed under an inert gas, such as nitrogen, and/or in a dry box or a Schlenk line.

After making and isolating the halogenated phenol, the halogenated phenol may be subjected to an elimination step to replace the halogen atom on the phenol with a boron dihydroxide group. In this step, halogenated phenol may be contacted with an alkyl lithium compound and a trialkyl borate in a polar aprotic solvent to from a phenol containing a boron dihydroxide group at the 6 position. The halogenated phenol, the alkyl lithium, and the trialkyl borate may be added in a molar ratio of about 1:2:1 or more. First, the halogenated phenol may be dissolved in the polar aprotic solvent and cooled to about 90 degrees Celsius or less, about 85 degrees Celsius or less, or about 80 degrees Celsius or less. The polar aprotic solvent and the halogenated phenol may be cooled to about 65 degrees Celsius or more, about 70 degrees Celsius or more, or about 75 degrees Celsius or more. After cooling, the halogenated phenol may be contacted with the alkyl lithium compound in the aprotic polar solvent to from an intermediate composition. The intermediate composition may be warmed to about room temperature (about 25 degrees Celsius) and may be stirred for about 0.5 hours or more, about 0.75 hours or more, or about 1.0 hour or more. The intermediate composition may be stirred for about 2.25 hours or less, about 1.75 hours or less, or about 1.25 hours or less. After stirring and before addition of the trialkyl borate, the intermediate composition may again be cooled to about 90 degrees Celsius or less, about 85 degrees Celsius or less, or about 80 degrees Celsius or less. The polar aprotic solvent and the halogenated phenol may be cooled to about 65 degrees Celsius or more, about 70 degrees Celsius or more, or about 75 degrees Celsius or more.

After cooling, the intermediate composition containing halogenated phenol, the alkyl lithium compound, or residues thereof in the aprotic polar solvent may be contacted with the trialkyl borate to form a phenol containing a borate ester at the 6 position in a product composition. After contacting with the trialkyl borate, the product composition may be allowed to warm to room temperature and stirred for about 30 hours or less, about 24 hours or less, or about 18 hours or less. The product composition may be stirred for about 6 hours or more, about 12 hours or more, or about 18 hours or more. Subsequently, an acid may be contacted with the product stream containing the phenol containing a borate ester at the 6 position in an aprotic solvent to catalyze hydrolysis and form the phenol containing a boron dihydroxide group at the 6 position. The acid may include acetic acid, hydrochloric acid, sulfuric acid, nitric acid, boric acid, perchloric acid, or any combination thereof. The acid may have a molarity of about 1.6 or more, about 1.8 or more, or about 2.0 or more. The acid may have a molarity of about 2.4 or less, about 2.2 or less, or about 2.0 or less. After hydrolyzing, the phenol containing a boron dihydroxide group at the 6 position may be isolated using any known technique or technique described herein, for example aqueous/organic extraction. The elimination step may be performed under an inert gas, such as nitrogen, and/or in a dry box or a Schlenk line.

After making the 2,6-halogenated 1-silylether substituted benzene, the 2,6-halogenated 1-silylether substituted benzene may be subjected to an elimination step to exchange one halogen with an aldehyde at the 2 position and rearrange the silyl group to exchange with the other halogen at the 6 position. In this step, the 2,6-halogenated 1-silylether substituted benzene may be contacted with an alkyl lithium compound and dimethylformamide in a polar aprotic solvent to form a phenol having a silyl and an acetaldehyde group at the 2 and 6 positions. The halogenated phenol, the alkyl lithium, and the dimethylformamide may be added in a molar ratio of about 1:4:4. First, 2,6-halogenated 1-silylether substituted benzene may be dissolved in the polar aprotic solvent and may be cooled to about 90 degrees Celsius or less, about 85 degrees Celsius or less, or about 80 degrees Celsius or less. The polar aprotic solvent and the 2,6-halogenated 1-silylether substituted benzene may be cooled to about 65 degrees Celsius or more, about 70 degrees Celsius or more, or about 75 degrees Celsius or more. After cooling, the 2,6-halogenated 1-silylether substituted benzene is contacted with the alkyl lithium compound in the polar aprotic solvent to form an intermediate composition and may be allowed to warm to 0 degrees Celsius and stirred for about 0.5 hours or more, about 1.0 hours or more, or about 1.5 hours or more. In other examples, the intermediate composition may allowed to warm to room temperature. The intermediate composition may be stirred for about 3.0 hours or less, about 2.5 hours or less, or about 2.0 hours or less.

After stirring and without an isolation step, the intermediate composition may be cooled to about 90 degrees Celsius or less, about 85 degrees Celsius or less, or about 80 degrees Celsius or less. The intermediate composition may be cooled to about 65 degrees Celsius or more, about 70 degrees Celsius or more, or about 75 degrees Celsius or more. After cooling, the intermediate composition containing the 2,6-halogenated 1-silylether substituted benzene, the alkyl lithium compound, and/or residues thereof in the polar aprotic solvent may be contacted with dimethylformamide to form phenol having a silyl and an acetaldehyde group at the 2 and 6 positions in a product composition. In addition to the dimethylformamide, a quenching agent diluted in a polar aprotic solvent may be added to form the phenol having a silyl and an acetaldehyde group at the 2 and 6 positions. Quenching agents may include NH$_4$Cl (aqueous). After cooling and after addition of the dimethylformamide, the product composition may be warmed to about 0 degrees Celsius and stirred for about 0.5 hours or more, about 0.75 hours or more, or about 1.0 hour or more. The product composition may be stirred for about 2.25 hours or less, about 1.75 hours or less, or about 1.25 hours or less. After formation of the phenol having a silyl and an acetaldehyde group at the 2 and 6 positions, the phenol having a silyl and an acetaldehyde group at the 2 and 6 positions may be purified or isolated using any known technique or any technique discussed herein, such as aqueous/organic extraction. The entire elimination step may be performed under an inert gas, such as nitrogen, and/or in a dry box or a Schlenk line.

After isolating the dialkyl or diaryl phosphate substituted phenol, the dialkyl or diaryl phosphate substituted phenol may be subjected to an addition step to form a phosphasalen, phosphasalph, or phosphasalcy ligand. For example, the phosphasalen, phosphasalph, or phosphasalcy ligand may have a structure according to compounds 1, 2, and/or 3 as described above.

In this step, the dialkyl or diaryl phosphate substituted phenol may be contacted with a bromine and a diamine in the presence of a polar aprotic solvent and a trialkyl amine to form the phosphasalen, phosphasalph, or phosphasalcy ligand. The dialkyl or diaryl phosphate substituted phenol, the bromine, and the diamine may be added in a molar ratio of about 2:2:1 or more. First and under a nitrogen stream (i.e., glove box or Schlenk line), the dialkyl or diaryl phosphate substituted phenol may be dissolved in the aprotic solvent and cooled to about 90 degrees Celsius or less, about 85 degrees Celsius or less, or about 80 degrees Celsius or less. The polar aprotic solvent and the dialkyl or diaryl phosphate substituted phenol may be cooled to about 65 degrees Celsius or more, about 70 degrees Celsius or more, or about 75 degrees Celsius or more. After cooling, the dialkyl or diaryl phosphate substituted phenol may be contacted with the bromine in the polar aprotic solvent to form an intermediate composition, and the intermediate composition may be warmed to room temperature (i.e., about 25 degrees Celsius) and stirred for about 0.25 hours or more, about 0.50 hours or more, or about 0.75 hours or more. The intermediate composition may be stirred for about 2.0 hours or less, about 1.50 hours or less, or about 1.25 hours or less. After stirring, the intermediate composition may be cooled to about 90 degrees Celsius or less, about 85 degrees Celsius or less, or about 80 degrees Celsius or less. The intermediate composition may be cooled to about 65 degrees Celsius or more, about 70 degrees Celsius or more, or about 75 degrees Celsius or more.

After cooling, the intermediate composition containing the bromine, the dialkyl or diaryl phosphate substituted phenol, and/or residues thereof in the polar aprotic solvent may be contacted with the diamine in the presence of the trialkyl amine to form the phosphasalen, phosphasalph, or phosphasalcy ligand in a product composition. After contacting, the product composition may be warmed to room temperature (i.e., about 25 degrees Celsius) and stirred overnight. For example, the product composition may be stirred for about 12 hours or more, about 18 hours or more, or about 23 hours or more. The product composition may be stirred for about 36 hours or less, about 30 hours or less, or about 25 hours or less. After stirring, any byproducts, such as ammonium bromide, may be precipitated from the composition using any known filtration technique, such as gravity filtration. The phosphasalen, phosphasalph, or phosphasalcy ligand may be isolated from the product composition by any known technique or any technique described herein. For example, the phosphasalen, phosphasalph, or phosphasalcy ligand may be isolated from the product composition by removing solvent through rotary evaporation and subjecting the phosphasalen, phosphasalph, or phosphasalcy to an additional precipitation step and an additional purification step in column chromatography. The entire addition step may be performed under an inert gas, such as nitrogen, and/or in a dry box or a Schlenk line.

After isolating the phenol containing a boron dihydroxide group at the 6 position, the phenol containing a boron dihydroxide group at the 6 position may be subjected to a Suzuki reaction step to form a $^R$dhbpy(H)$_2$ or $^R$dhphen(H)$_2$ ligand. For example, the $^R$dhbpy(H)$_2$ or $^R$dhphen(H)$_2$ ligand may have a structure according to compounds 10 and/or 11.

In this Suzuki reaction step, the phenol containing a boron dihydroxide group at the 6 position may be contacted with a dibromo bipyridine or a dibromo phenanthroline containing one or more halogens adjacent to the nitrogen atom in the presence of one or more polar solvents, an alkali metal carbonate, and a palladium catalyst to form a ligand according to compound 10 and/or 11 in a product composition. The one or more polar solvents may be a combination of solvents to dissolve one or more compounds in the reaction. The one or more polar solvents may be protic, aprotic, or a combination of both protic and aprotic solvents. The phenol containing a boron dihydroxide group at the 6 position and the dibromo bipyridine or the dibromo phenanthroline containing one or more halogens adjacent to the nitrogen atom may be added in a molar ratio of about 2:1 or more. Additionally, bromic acid may be added to the combination of phenol containing a boron dihydroxide group at the 6 position and the dibromo bipyridine or dibromo phenanthroline in a molar ratio of about 2:2:1 or more. The palladium catalyst may be added in a solution of about 2 mole percent or more, about 3 mole percent or more, or about 4 mole percent or more. The palladium catalyst may be added in a solution of about 8 mole percent or less, about 7 mole percent or less, or about 6 mole percent or less. The alkali metal carbonate may be added in a solution of about 1.6 M or more, about 1.8 M or more, or about 2.0 M or more. The alkali metal carbonate may be added in a solution of 2.6 or less, about 2.4 or less, or about 2.2 or less. After contacting the ingredients, the Suzuki reaction step may be carried out at reflux for about 72 hours or less, about 96 hours or less, or about 120 hours or less. The Suzuki reaction step may be carried out at reflux for about 24 hours or more, about 48 hours or more, or about 70 hours or more. After reflux, the ligand according to compound 10 and/or 11 is removed from the product composition using any known extraction technique described herein or known by the skilled artisan. For example, the ligand according to compound 10 and/or 11 may be removed by adding a solvent that dissolves the ligand, such as a polar aprotic solvent, adding a brine (i.e., aqueous solution), extracting the brine, and evaporating the polar aprotic solvent to leave a dry ligand. The Suzuki reaction step may be conducted under an inert gas, such as nitrogen, and in a dry box and/or Schlenk line.

After isolating the phenol having a silyl and an acetaldehyde group at the 2 and 6 positions, the phenol having a silyl and an acetaldehyde group at the 2 and 6 positions may be subjected to a condensation step to form a silyl substituted salen, salph, or salcy ligand. For example, the silyl substituted salen, salph, or salcy ligand may have a structure according to compounds 16, 17, and/or 18. In this step, the phenol having a silyl and an acetaldehyde group at the 2 and 6 positions may be contacted with a diamine in the presence of a Lewis acid or Bronsted acid and a alkali metal or ammonium salt in the a polar solvent subjected to form the silyl substituted salen, salph, or salcy ligand in a product composition. In other examples, the reaction may be free of a Lewis acid or Bronsted acid so that the diamine and the phenol having a silyl and an acetaldehyde group at the 2 and 6 positions may be contacted in a polar solvent. These steps may be completed in ambient air and may be completed at room temperature (e.g., about 25 degrees Celsius) or may be completed at reflux of the polar solvent. The phenol having a silyl and an acetaldehyde group at the 2 and 6 positions and the diamine, may be added in a molar ratio of about 1:2 or more. The Lewis acid or Bronsted acid may be added in an amount sufficient to catalyze the condensation reaction. The silyl substituted salen, salph, or salcy ligand may be isolated from the product composition by any known technique or any technique described herein. For example, the silyl substituted salen, salph, or salcy ligand may be collected as a precipitate by gravity filtration after the product composition has cooled.

After forming the phosphasalen, phosphasalph, or phosphasalcy ligand, the $^R$dhbpy(H)$_2$ or $^R$dhphen(H)$_2$ ligand, or the silyl substituted salen, salph, or salcy ligand, the ligands may be subjected to a metalation step to form a Lewis acid containing a halogen or an alkyl group. The Lewis acids containing the halogen or the alkyl group may have a structure according to compounds 4, 5, 6, 12, 13, 19, 20, and/or 21 described above. The halogen or the alkyl group of the Lewis acid may be bonded to the metal center of the Lewis acid. In the metalation step, a metal alkyl compound may be contacted with the phosphasalen, phosphasalph, or phosphasalcy ligand, the $^R$dhbpy(H)$_2$ or $^R$dhphen(H)$_2$ ligand, or the silyl substituted salen, salph, or salcy ligand in a nonpolar solvent at room temperature to form a Lewis acid containing a halogen or alkyl group. The metal alkyl compound and phosphasalen, phosphasalph, or phosphasalcy ligand, the $^R$dhbpy(H)$_2$ or $^R$dhphen(H)$_2$ ligand, or the silyl substituted salen, salph, or salcy ligand may be added in a molar ratio of about 1:1. The metalation step may be stirred for any amount of time sufficient to form the Lewis acid containing the halogen or the alkyl group. For example, the metalation step may be stirred for about 36 hours or less, about 30 hours or less, or about 24 hours or less. The metalation step may be stirred for about 12 hours or more, about 18 hours or more, or about 22 hours or more. The metalation step may be conducted under an inert gas, such as nitrogen, and in a dry box and/or Schlenk line. The metalation step may be conducted in open air or may be conducted in an inert atmosphere free of oxygen and water, such as a dry box or Schlenk line. The metalation step may be similar to the metalation steps described in U.S. Pat. No. 8,633,123, incorporated herein by reference in its entirety. After the metalation step is complete, the Lewis acid containing the halogen or the alkyl group may be isolated using any known technique, such as collecting the Lewis acid containing the halogen or the alkyl group by gravity filtration. The steps to form the Lewis acid containing the halogen or alkyl group may be performed under conditions that are moisture and oxygen free, for example, under an inert gas, like nitrogen, in a dry box or Schlenk line.

After forming and isolating one of the Lewis acids containing the halogen or the alkyl group above, the Lewis acids containing the halogen or the alkyl group may be subjected to a catalyst formation step to form the carbonylation catalyst. The carbonylation catalyst may have one of the structures described above in compounds 7, 8, 9, 14, 15, 22, 23, and/or 24. The catalyst formation step may include contacting the Lewis acids containing the halogen or the alkyl group with a polar ligand, a metal carbonyl additive, or both to from the carbonylation catalyst. The Lewis acid containing the halogen or alkyl group may be added in a molar ratio of about 1:1. The metal carbonyl additive may contain at least a metal carbonyl that is anionic and a cationic group that is configured to cleave and bond with the alkyl group or the halogen of the metal centered compound. The cationic group may be one or more of an alkali metal, $(R_4)_3Si$—, any counterion sufficient to ionically bond and/or balance the metal carbonyl, or any combination thereof, where $R_4$ is independently selected from a phenyl, halophenyl, hydrogen, alkyl, alkylhalo, alkoxy, or any combination thereof. In examples where the metal carbonyl additive cleaves or decouples the alkyl group, the alkyl group may couple with the cationic group, and the alkyl group and cationic group could be removed via any filtration or removal means described herein. In examples where the metal carbonyl additive cleaves the halogen from the metal centered compound and is contacted with the polar compound, the halogen bonds with the cationic group of the metal carbonyl additive and the Lewis acid containing the polar compound is formed. Any byproducts can be removed by any other removal or separation steps described herein. After the metal carbonyl additive cleaves or decouples the alkyl group, the Lewis acid may combine with the polar ligand to form a cationic species. The Lewis acid containing the polar ligand then contacts with the anionic metal carbonyl of the metal carbonyl additive and forms the regenerated carbonylation catalyst.

The steps to form the carbonylation catalyst may be performed under conditions that are moisture and oxygen free. For example, the catalyst formation steps may be performed within a dry glove box, on a Schlenk line, or in a reactor under an inert atmosphere (i.e., nitrogen). The catalyst formation steps may be performed under a nitrogen, argon, or any other inert gas. During the catalyst formation steps, the Lewis acid, the polar ligand, the metal carbonyl, or any combination thereof may be contacted and agitated by stirring for a period of time sufficient to form the carbonylation catalyst. The period of time for stirring the components may be about 5 minutes or more, about 30 minutes or more, about 60 minutes or more. The period of time for stirring the components may be about 24 hours or less, about 12 hours or less, or about 6 hours or less. The components in the catalyst formation steps may be completed under ambient temperature and/or pressure. Additional steps to make the regenerated catalyst can be found in U.S. Pat. No. 6,852,865B2 and U.S. Pat. No. 8,481,756B1, both of which are included herein by reference in their entirety.

The filtering, isolating, or removing steps taught herein function to remove from the composition any unwanted components that may interfere with the formation of a carbonylation catalyst or any precursor of the carbonylation catalyst. For example, one or more of solvents, polymers, unreacted acid compounds, inorganic compounds, organic compounds, or any combination thereof may be removed from the composition so that the carbonylation catalyst may be regenerated from the Lewis acid containing a halogen or a alkyl compound and have catalytic activity with one or more of succinic anhydride, propiolactone, or an epoxide. The filtering, isolating, or removing steps may include one or more of vacuum filtration, gravity filtration, centrifugation, decantation, precipitation, phase layer extraction, or any combination thereof. The filtering, isolating, or removing steps may utilize any method sufficient to separate one or more of solvents, polymers, unreacted acid compounds, inorganic compounds, organic compounds, or any combination thereof and the Lewis acid containing the halogen or a alkyl group, the ligands, or any combination thereof. The filtering, isolating, or removing steps may remove a single type of compound at a time, such as a precipitate, or may remove a collection of compounds at a time, such as all components dissolved in a solvent. The filtering or removing steps may include forming multiple phases including one or more of one or more organic phases, an aqueous phase, a solid phase (i.e., a precipitate), one or more gaseous or vapor phases, or any combination thereof. The one or more separation or removal steps/methods described herein may be performed at any temperature, pressure, agitation rate, time, or any combination thereof sufficient to separate or remove any undesirable component from the composition including the ligands, the Lewis acid containing the halogen or alkyl group, or any combination thereof.

The carbonylation catalyst as described herein functions to catalyze a reaction of an epoxide and carbon monoxide to produce one or more propiolactones and other products. The carbonylation catalyst includes at least a metal carbonyl that is anionic and a Lewis acid that is cationic.

The metal carbonyl of the carbonylation catalyst functions to provide the anionic component of the carbonylation catalyst. The carbonylation catalyst may include one or more, two more, or a mixture of metal carbonyls. The metal carbonyl may be capable of ring-opening an epoxide and facilitating the insertion of CO into the resulting metal carbon bond. In some examples, the metal carbonyl may include an anionic metal carbonyl moiety. In other examples, the metal carbonyl compound may include a neutral metal carbonyl compound. The metal carbonyl may include a metal carbonyl hydride or a hydrido metal carbonyl compound. The metal carbonyl may be a pre-catalyst which reacts in situ with one or more reaction components to provide an active species different from the compound initially provided. The metal carbonyl includes an anionic metal carbonyl species. in some examples, the metal carbonyl may have the general formula $[Q_dM'_e(CO)_w]^{y+}$, where Q is an optional ligand, M' is a metal atom, d is an integer between 0 and 8 inclusive, e is an integer between 1 and 6 inclusive, w is a number such as to provide the stable anionic metal carbonyl complex, and y is the charge of the anionic metal carbonyl species. The metal carbonyl may include monoanionic carbonyl complexes of metals from groups 5, 7 or 9 of the periodic table or dianionic carbonyl complexes of metals from groups 4 or 8 of the periodic table. The metal carbonyl may contain cobalt, manganese, ruthenium, or rhodium. Exemplary metal carbonyls may include $[Co(CO)_4]^-$, $[Ti(CO)_e]^{2-}$, $[V(CO)_6]^-$, $[Rh(CO)_4]^-$, $[Fe(CO)_4]^{2-}$, $[Ru(CO)_4]^{2-}$, $[Os(CO)_4]^{2-}$, $[Cr_2(CO)_{10}]^{2-}$, $[Fe_2(CO)_8]^{2-}$, $[Tc(CO)_5]^-$, $[Re(CO)_5]^-$, and $[Mn(CO)_5]^-$. The metal carbonyl may be a mixture of two or more anionic metal carbonyl complexes in the carbonylation catalysts used in the methods.

The halogenating agent may function to couple a halogen atom to a phenol. The halogenating agent may be any compound containing one or more halogens that can be coupled to a phenol. The halogenating agent may be one or more of N-bromosuccinimide, bromine (i.e., $Br_2$), dibromisocyanuric acid, or any combination thereof.

The alkyl lithium compound may function to replace a halogen group on a phenol with another compound. The alkyl lithium compound may be n-butyllithium, t-butyllithium, or any combination thereof. Where n-butyllithium is used, an additive to activate the n-butyllithium may be used, such as tetramethylethylenediamine, hexamethylphophoramid, N,N'-Dimethylpropyleneurea, or any combination thereof.

The halo-di(aryl or alkyl) phosphine may function to form a disubsituted phosphine group on a phenol compound. The halo-di(aryl or alkyl) phosphineinclude one or more of chloro-di(aryl) phosphine, chloro-di(alkyl) phosphine, or both.

The silyl halide may function to form a silyl ether on a phenol group. The silyl halide may include one or more of fluorine, chlorine, bromine, and/or iodine. The silyl halide may contain a trisubstituted silicone group, for example, having a structure of $Si(R_3)_3$, where $R_3$ is described above in relation to compounds 1 to 24.

The trialkyl borate may function to form a compound suitable for a Suzuki coupling reaction. The trialkyl borate may be trimethyl borate, or any combination thereof.

The diamines used herein may function to form a ligand by connecting two substituted phenol groups. The diamine may be any substituted compound containing at least two amine groups that are separated by at least two carbon atoms. The diamine may be one or more of an ethylene diamine, an ortho phenylene amine, an ortho cyclohexyl diamine, or any combination thereof.

The trialkyl amine may be a compound sufficient to consume generated HBr in the form of an ammonium salt, such as tributylammonium bromide. The trialkyl amine may be one or more of tributyl amine, triethyl amine, trimethyl amine, or any combination thereof.

The Lewis acid or Bronsted acid catalyst may function to catalyze a condensation reaction. The Lewis acid or Bronsted acid catalyst may be one or more of formic acid, acetic acid, aluminum chloride, or any combination thereof.

The alkali metal carbonate may function to decompose a boron dihydroxide. The alkali metal carbonate may include one or more of $Na_2CO_3$, or any combination thereof. In lieu of the alkali metal carbonate, a alkali metal, alkoxide, and/or alkali metal hydroxide could be used to decompose the boron dihydroxide.

The metal alkyl compound may function to coordinate a metal in one or more ligands to form a Lewis acid containing a halogen or an alkyl group. The metal alkyl compound may be any compound containing a metal and/or one or more alkyl groups and/or halogen group. The metal of the metal alkyl compound may be one or more of aluminum, chromium, or any combination thereof. The meal alkyl compound may include one or more of $CrCl_2$, $(Et)2AlCl$ or $(Et)3Al$, or any combination thereof.

A metal carbonyl additive functions to deliver a metal carbonyl to a Lewis acid that is suitable to combine and form the carbonylation catalyst. The metal carbonyl additive may function to decouple a halogen or a alkyl group from a Lewis acid to form the carbonylation catalyst that includes the Lewis acid and metal carbonyl combination. The metal carbonyl additive includes at least a metal carbonyl as described herein and a cationic compound. The cationic compound may include lithium, sodium, potassium, rubidium, cesium, beryllium, magnesium, calcium, strontium, barium, radium, or any combination thereof. The metal carbonyl additive may be a salt. The metal carbonyl additive may be a silicon salt in the form of $R_3Si—$, where R is independently selected from a phenyl, halophenyl, hydrogen, alkyl, alkylhalo, alkoxy, or any combination thereof. The metal carbonyl additive may be $NaCo(CO)_4$, $Co_2(CO)_8$, $HCo(CO)_4$, or any combination thereof. Where a Lewis acid containing a halogen is formed after the metalation step, $NaCo(CO)_4$ may be used to form the carbonylation catalyst. Where a Lewis acid containing an alkyl group is formed, $Co_2(CO)_8$ or $HCo(CO)_4$ may be used to form the carbonylation catalyst.

In some Lewis acids, one or more polar ligands may coordinate to M, or a combination thereof and fill the coordination valence of the metal atom. The polar ligand may be a solvent. The polar ligand may be any compound with at least two free valence electrons. The polar ligand may be aprotic. The compound may be tetrahydrofuran, dioxane, diethyl ether, acetonitrile, carbon disulfide, pyridine, epoxide, ester, lactone, or a combination thereof.

The solvent may be a polar aprotic solvent, a polar protic solvent, or a nonpolar solvent that functions to dissolve one or more compounds described herein. One solvent may be soluble in one or more other solvents to increase solubility of one or more of the compounds described herein. A first solvent may be combined with a second solvent that is miscible in the first solvent to precipitate components that are insoluble in the second solvent. The solvents may be selected to form an organic phase or an aqueous phase layer that is distinct from another aqueous phase layer, another organic phase layer, a precipitate, or any some combination. The solvent may be one or more of water, methanol, ethanol, propanol, hexane, heptane, nonane, decane, tetrahydrofuran, methyltetrahydrofuran, diethyl ether, sulfolane, toluene, pyridine, diethyl ether, 1,4-dioxane, acetonitrile, ethyl acetate, dimethoxy ethane, acetone, chloroform, dichloromethane, or any combination thereof.

Several techniques have been theorized to illustrate the teaching of the present disclosure. Each teaching is simply an example of the disclosure and is not intended to limit the teachings to any single technique.

FIG. 1 is a synthetic scheme to form a carbonylation catalyst with a Lewis acid containing a silyl substituted salen, salph, or salcy ligand. After isolating two equivalents of $Br_2$ for one equivalent of appropriate 4-substituted phenol are added to a reaction vessel equipped with a stir bar in the amounts of 0.01 mol of appropriate pre-isolated 2,6-dibromophenol in 10 mL of THF solvent. The solution is cooled with an ice bath (0° C.) and a slight excess of triethylamine (0.012 mol) is added and a subsequently a slight excess of appropriate trisubstituted chlorosilane. The mixture is stirred for 2 hours at room temperature and the solvent is then removed by reduced pressure methods. The residue is taken up into hexanes and filtered over diatomaceous earth and the solvent is once again removed to yield the desired product. In a reaction vessel equipped with a stir bar the appropriate 2,6-dibromophenol silylether (0.0015 mol) in diethyl ether (3.0 mL) is cooled to −78° C. and treated with four equivalents of t-butyllithium (0.006 mol). The reaction is stirred for 1.5 h at 0° C. In the same reaction vessel, the reaction mixture is cooled to −78° C. and 0.006 mol of DMF is added and stirred at 0 C for 1 h. The reaction is then quenched with 5.0 mL of saturated $NH_4Cl$ solution and diluted with 75 mL diethyl ether. The organic and aqueous phases are separated, and the organic phase is dried to yield the desired product. The ligand synthesis is completed by reacting the silyl salicylaldehyde with orthophenylene diamine in a ratio of 2.2 to 1. Salicylaldehyde in an amount of 0.004 mol is dissolved in 30 mL of ethanol (EtOH) and added 0.00176 mol ortho-phenylene diamine and refluxed overnight. The temperature subsequently is reduced and the product is isolated by gravity filtration after precipitation of the ligand from the EtOH. using standard methods for condensation reaction between aldehyde of the salicylaldehyde precursor containing a silyl group and a diamine. After the ligand is formed, a reaction vessel under an inert atmosphere is charged with 0.1 mol of ligand in 100 mL toluene solvent (1.0 M). One equivalent of $Et_2AlCl$ is added to the solution slowly and allowed to stir at room temperature overnight. Product is collected by filtration after precipitation from solution. To form the carbonylation catalyst, a reaction vessel under an inert atmosphere is charged with 0.1 mol of metalated ligand in 100 mL THF solvent (1.0 M). One equivalent of $NaCo(CO)_4$ is added to the solution slowly and allowed to stir at room temperature overnight. Product is filtered to removed NaCl byproduct. The product is collected by precipitating the catalyst from THE solvent by addition of anti-solvent hexanes which is then collected by filtration.

Figure 2:
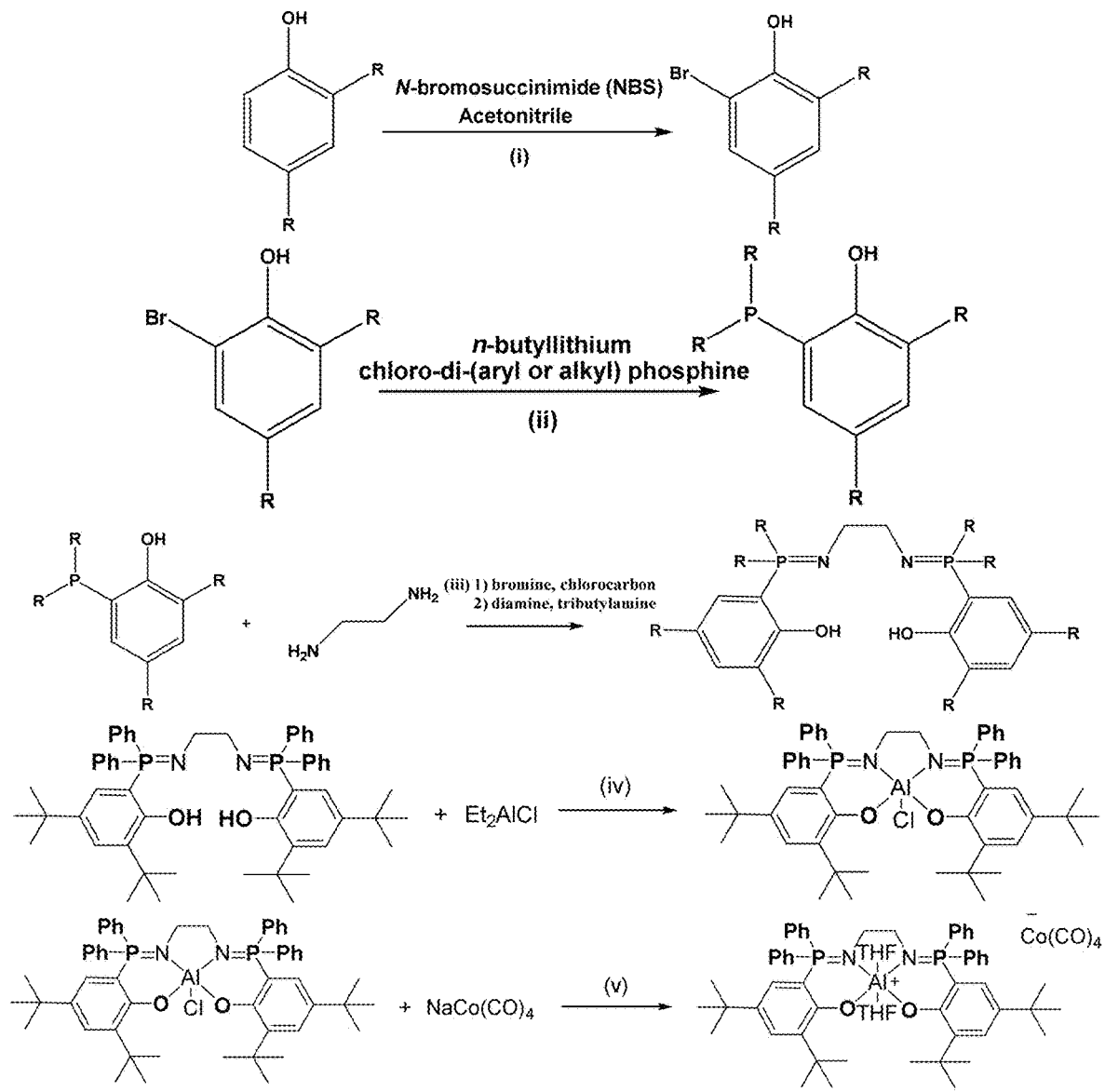
FIG. 2 is a synthetic scheme to form a carbonylation catalyst with a Lewis acid containing a phosphasalen, phosphasalph, phosphasalcy ligands.

FIG. 2 is a synthetic scheme to form a carbonylation catalyst with a Lewis acid containing phosphasalen, phosphasalph, or phosphasalcy ligand. A reaction vessel is charged with appropriate 2,4-disubstituted phenol (0.1 mol) in 300 mL of acetonitrile. The reaction is cooled to 0° C. and 0.1 mol of N-bromosuccinimide is added and is stirred overnight at room temperature. The reaction mixture is washed with $Na_2SO_3$ and the phases are separated. The organic layer is then collected, and the solvent is removed by rotary evaporation. After isolating, to a reaction vessel under an inert atmosphere is added the appropriate 2-bromo-4,6-disubstituted phenol (0.014 mol) in 50 mL of diethyl ether and is reduced in temperature to −78° C. To the cooled solution, 0.0295 mol of n-butyl lithium, a slight excess, is added slowly. The reaction mixture is brought back to room temperature for 1 hour. Subsequently, the reaction mixture is cooled to −78° C. and 0.014 mol of the appropriate chlorophosphine ($R_2PCl$) is added and stirred overnight at room temperature. The solution is washed with $KH_2PO_4$. The layers are separated and the organic is layer is dried and the solvent removed by rotary evaporation. To a reaction vessel under an inert atmosphere is added the appropriate 2,4-disubstituted-6-($R_2$phosphaneyl) phenol (0.00512 mol) in 60 mL dichloromethane solvent. The temperature is reduced to −78° C. and liquid bromine (0.00512 mol) is added slowly and then stirred at room temperature for 2 hours. The reaction mixture is reduced in temperature again to −78° C. and 0.00256 mol of tributylamine and 0.00256 mol of ethylene diamine is added slowly and stirred at room temperature overnight. The reaction mixture is filtered, and the filtrate is dried by reduced pressure. The oil is the stirred in THF to afford a white solid that is further purified by column chromatography. After the ligand is formed, a reaction vessel under an inert atmosphere is charged with 0.1 mol of ligand in 100 mL toluene solvent (1.0 M). One equivalent of $Et_2AlCl$ is added to the solution slowly and allowed to stir at room temperature overnight. Product is collected by filtration after precipitation from solution. To form the carbonylation catalyst, a reaction vessel under an inert atmosphere is charged with 0.1 mol of metalated ligand in 100 mL THF solvent (1.0 M). One equivalent of $NaCo(CO)_4$ is added to the solution slowly and allowed to stir at room temperature overnight. Product is filtered to removed NaCl byproduct. The product is collected by precipitating the catalyst from THF solvent by addition of anti-solvent hexanes which is then collected by filtration.

Figure 3:
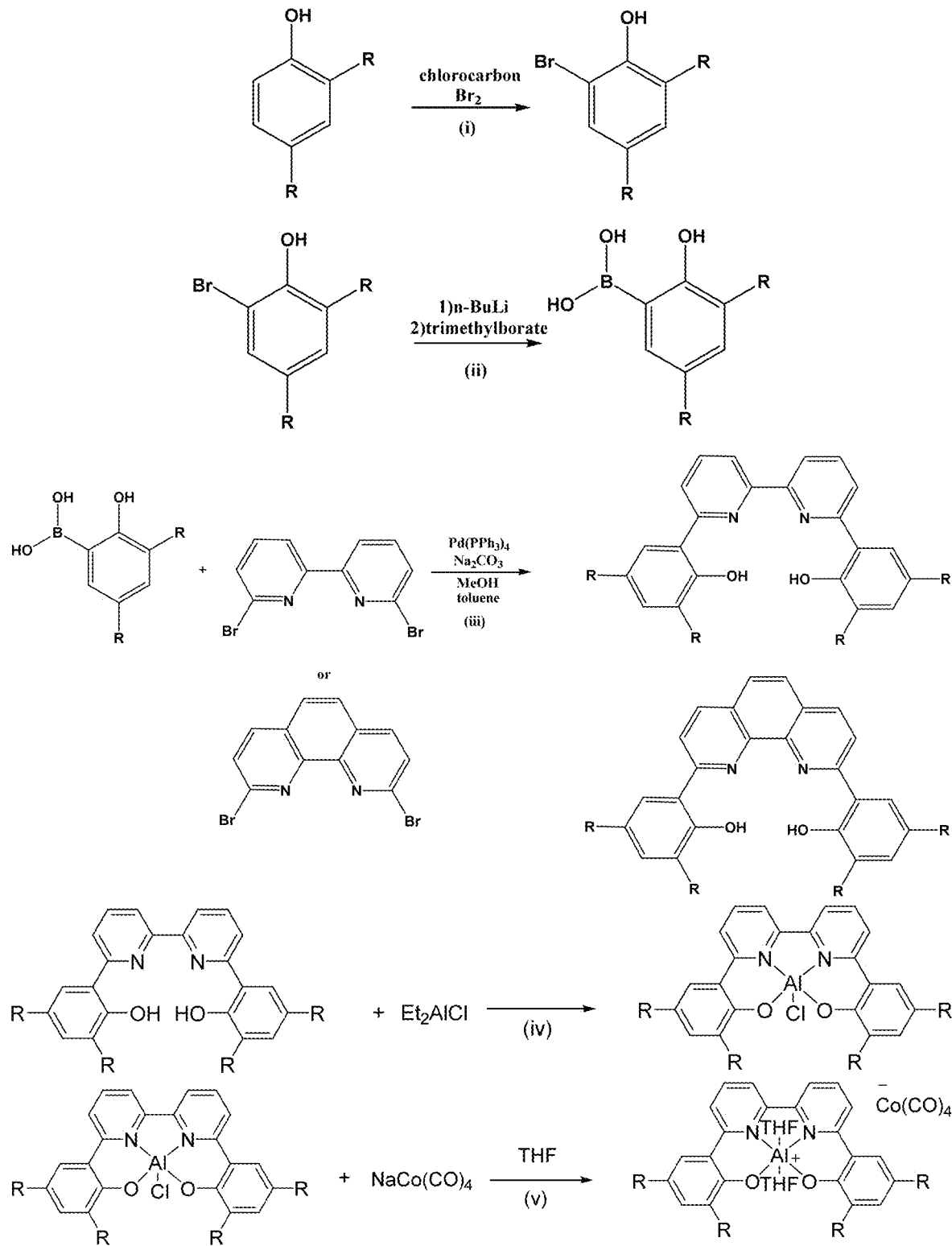
FIG. 3 is a synthetic scheme to form a carbonylation catalyst with a Lewis acid containing a $^R$dhbpy(H)$_2$ or $^R$dhphen(H)$_2$ ligand.

FIG. 3 is a synthetic scheme to form a carbonylation catalyst with a Lewis acid containing a $^R$dhbpy(H)$_2$ or $^R$dhphen(H)$_2$ ligand. A reaction vessel under an inert atmosphere is charged with 0.10 mol of 2,4-disubstituted phenol in 100 ml of solvent (1.0 M reaction). Added at −78° C. is one equivalent (0.10 mol) of $Br_2$ and stirred for 2 hours at room temperature. The reaction mixture is then quenched with 50 mL of sat. $NaHCO_3$ solution and the organic and aqueous layers are separated. The organic phase after drying with $MgSO_4$ or $Na_2SO_4$ is slurried with basic alumina and then is filtered over a combo of silica gel and diatomaceous earth. After isolating, a reaction vessel under an inert atmosphere is charged with the 2-bromo-4,6-disubstituted phenol (0.0175 mol) in 200 mL diethyl ether solvent (~0.1 M). Solution is reduced in temperature to −78° C. and a slight excess of n-butyllithium (0.042 mol) of n-BuLi is added to the reaction vessel slowly. After addition, the reaction is stirred at room temperature for 2 hours. The reaction mixture is then reduced to in temperature to −78° C. again 0.0282 mol of trimethylborate is added. The reaction is allowed to reach room temperature and is stirred for 18 hours. The reaction is then reduced in temperature to 0° C. and is quenched with 2M HCl solution. The organic and aqueous phases are separated and the product is collected by reduced pressure evaporation of solvent. Subsequently, a reaction vessel under an inert atmosphere is charged with 0.00637 mol of dibromo pyridine linker ligand (either 6,6'-dibromo-bipyridine or 2,9-dibromo-1,10-phenanthroline) in 250 mL toluene with 0.0127 mol of the previously synthesized 3,5-disubstituted-2-hydroxy-phenyl) boronic acid, 30 mL of MeOH, 60 mL of 2M $Na_2CO_3$, and 5 mol % $Pd(PPh_3)_4$. The mixture is refluxed for 72 h under an inert atmosphere. After cooling, the organic and aqueous phases are separated and the organic solvent is removed under reduced pressure to yield the desired ligand. After the ligand is formed, a reaction vessel under an inert atmosphere is charged with 0.1 mol of ligand in 100 mL toluene solvent (1.0 M). One equivalent of $Et_2AlCl$ is added to the solution slowly and allowed to stir at room temperature overnight. Product is collected by filtration after precipitation from solution. To form the carbonylation catalyst, a reaction vessel under an inert atmosphere is charged with 0.1 mol of metalated ligand in 100 mL THF solvent (1.0 M). One equivalent of NaCo $(CO)_4$ is added to the solution slowly and allowed to stir at room temperature overnight. Product is filtered to removed NaCl byproduct. The product is collected by precipitating the catalyst from THF solvent by addition of anti-solvent hexanes which is then collected by filtration.

ENUMERATED EMBODIMENTS

The following examples are provided to illustrate the invention but are not intended to limit the scope thereof. All parts and percentages are by weight unless otherwise indicated.

Embodiment 1. A compound according to one of the formulas:

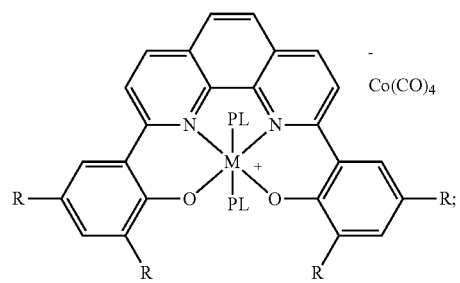

-continued

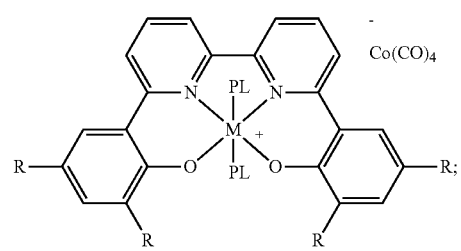

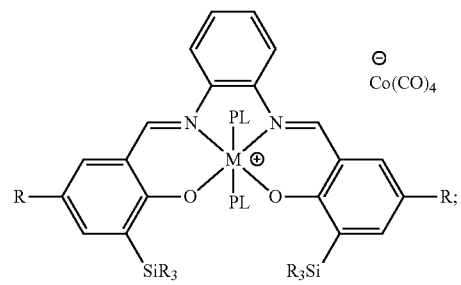

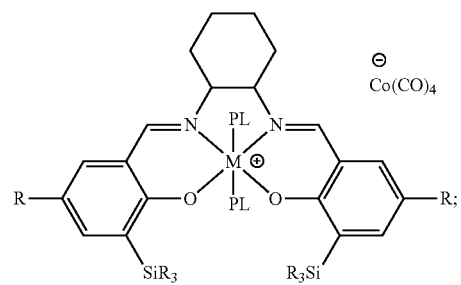

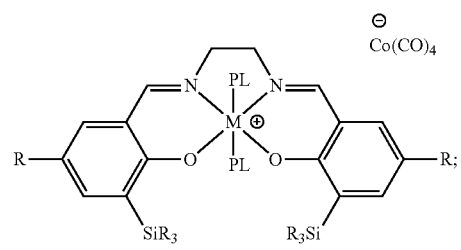

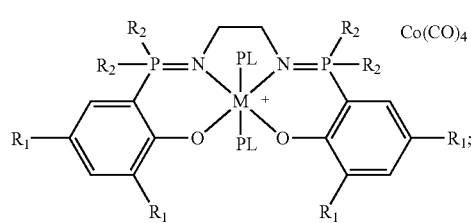

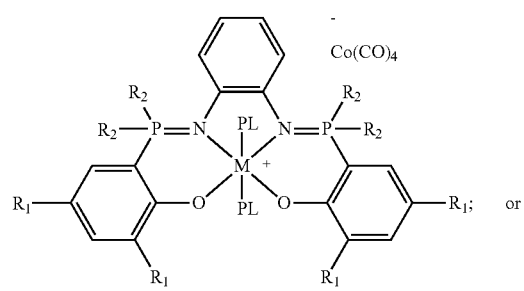

-continued

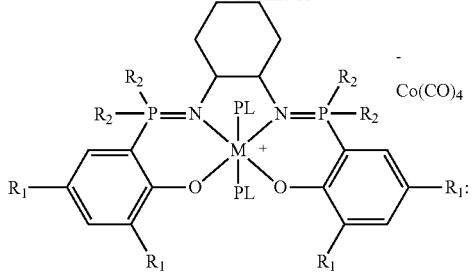

wherein R is separately in each occurrence an hydrogen, alkyl, or aryl group;
$R_1$ is separately in each occurrence hydrogen, aryl, or alkyls group;
$R_2$ is separately in each occurrence an alkyl, aryl, or alkoxide group;
$R_3$ is separately in each occurrence an alkyl or aryl group
PL is the residue of a polar ligand; and
M is separately in each occurrence a Lewis Acid metal.

Embodiment 2. The compounds according to Embodiment 1 wherein:
R is separately in each occurrence an alkyl or aryl group;
$R_1$ is separately in each occurrence an alkyl group;
$R_2$ is separately in each occurrence an alkyl group;
$R_3$ is separately in each occurrence an alkyl group
PL is the residue of tetrahydrofuran, diethyl ether, or a combination thereof, and
M is separately in each occurrence aluminum or chromium.

Embodiment 3. A method for preparing a compound according to Embodiment 1 or 2 comprising:
contacting of a compound according to one of the formulas:

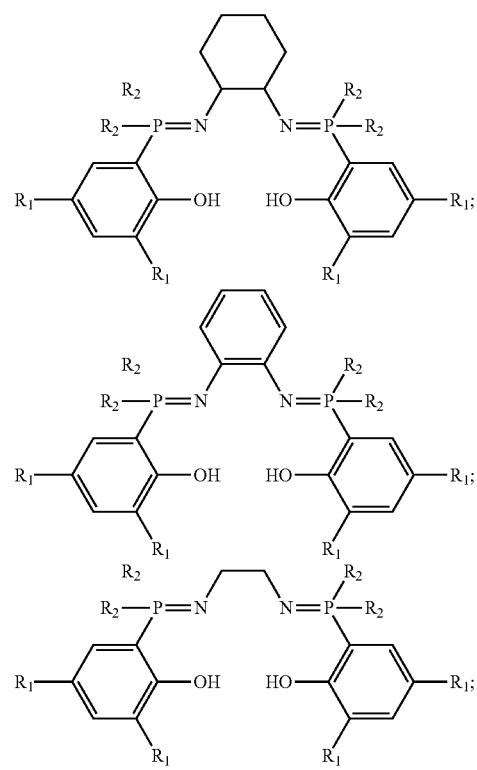

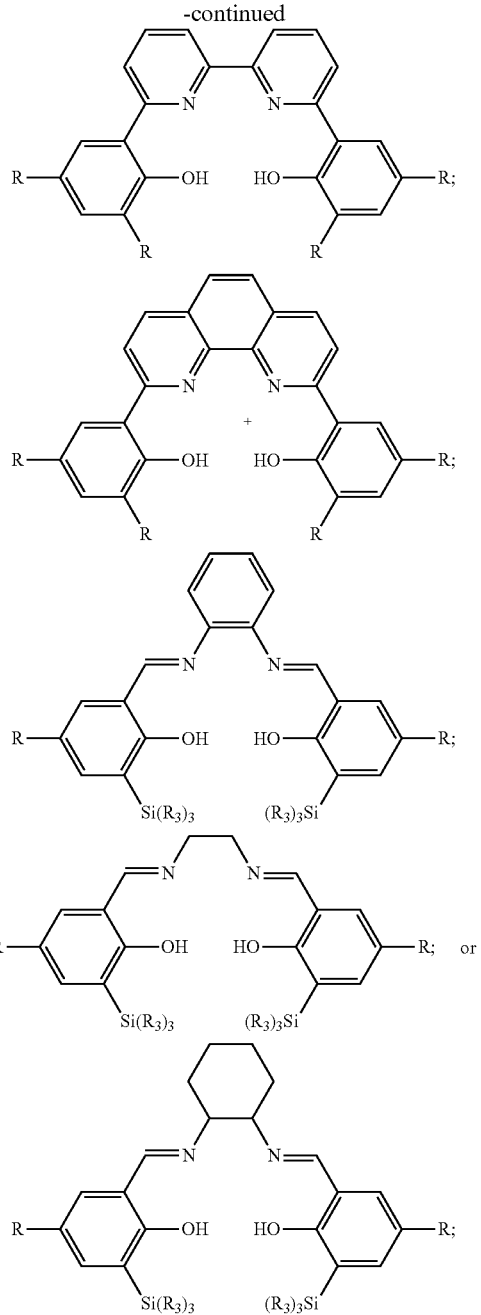
with a metalating agent to form one of the compounds according to the formula
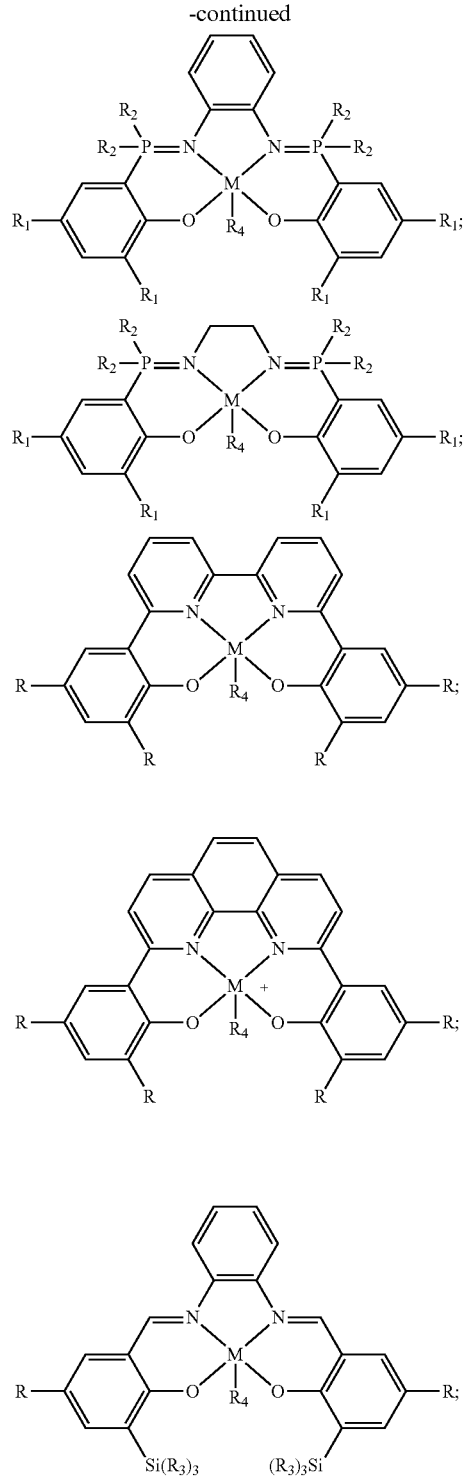
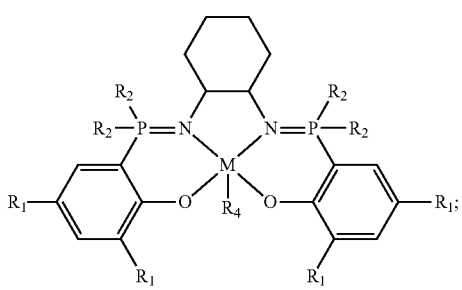
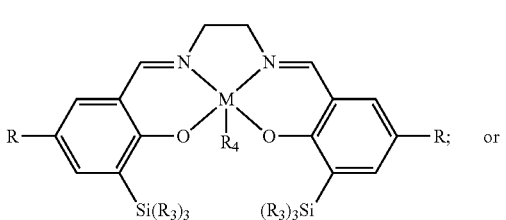

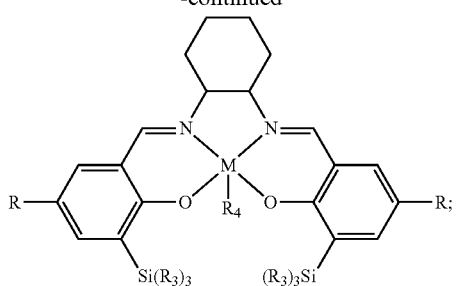

and contacting the formed compounds with a metal carbonyl under condition such that one of the following compounds are formed:

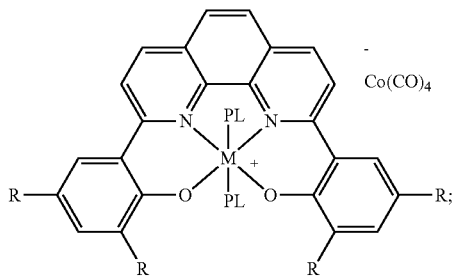

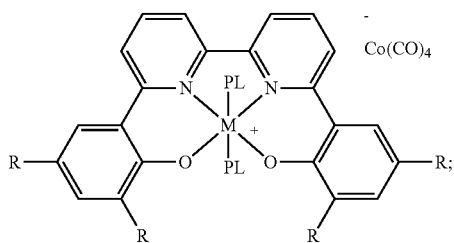

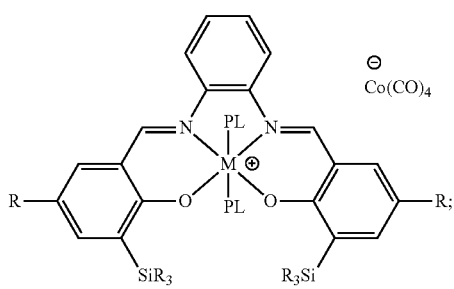

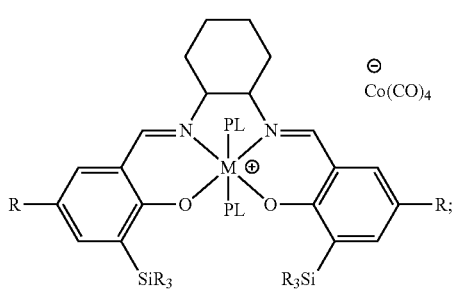

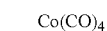

wherein R is separately in each occurrence an hydrogen, alkyl, or aryl $R_1$ is separately in each occurrence hydrogen, aryl, or alkyl group;

$R_2$ is separately in each occurrence an alkyl, aryl, or alkoxide group;

$R_3$ is separately in each occurrence an alkyl or aryl group $R_4$ is separately in each occurrence an alkyl group or a halogen group;

PL is the residue of a polar ligand; and

M is separately in each occurrence a Lewis Acid metal.

Embodiment 4. The method according to Embodiment 3 wherein:

R is separately in each occurrence an alkyl or aryl group;

$R_1$ is separately in each occurrence an alkyl group;

$R_2$ is separately in each occurrence an alkyl group;

$R_3$ is separately in each occurrence an alkyl group;

$R_4$ is separately in each occurrence an alkyl group or a halogen

PL is the residue of tetrahydrofuran, diethyl ether, or a combination thereof; and M is separately in each occurrence aluminum or chromium.

Embodiment 5. The method according to Embodiment 3 or 4 comprising preparing one of the compounds according to the one of the formulas

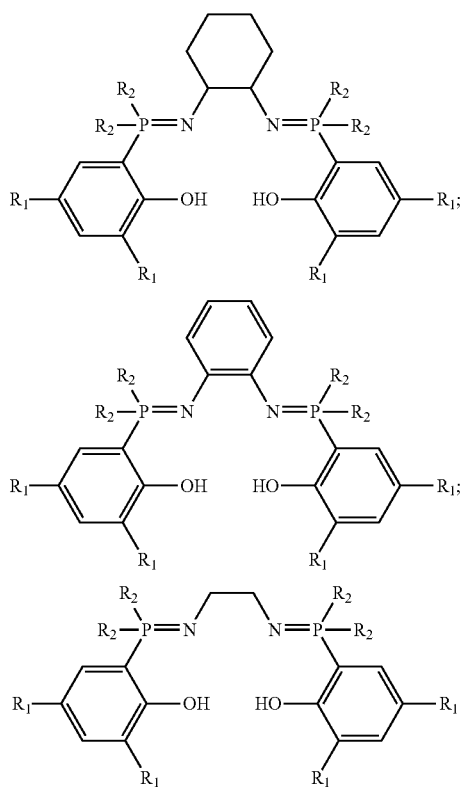

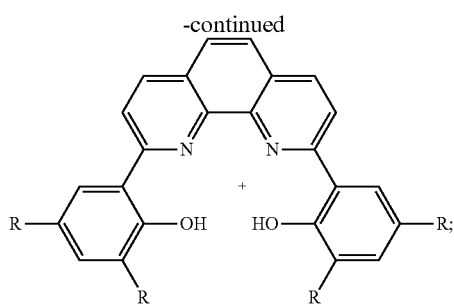

by:
contacting a phenol which may be substituted at the 2 and/or 4 position with an hydrogen, alkyl, or aryl group with a halogenating agent under conditions such that a halogen atom is added at the 6 carbon atom to form a halogenated phenol;
contacting the formed halogenated phenol with a trialkyl borate in the presence of an alkyl lithium compound to replace the halogen atom with a boron dihydroxide group; and
contacting phenol containing a boron dihydroxide group with bipyridine or phenanthroline having halogen groups on carbons adjacent to the nitrogen atoms in the presence of a palladium catalyst and an alkali metal carbonate under conditions to form one of the compounds of the formulas.

Embodiment 7. The method according to Embodiment 3 or 4 comprising preparing one of the compounds according to one of the formulas:

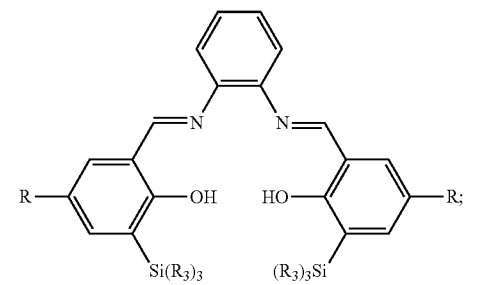

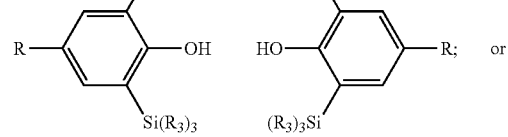

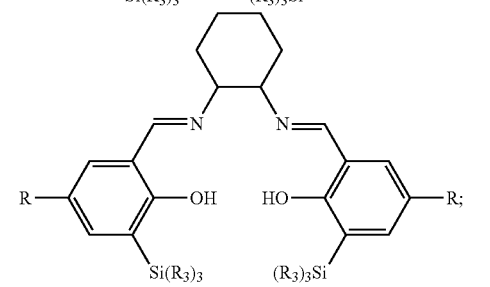

by:
contacting a phenol which may be substituted at the 2 and/or 4 position with an hydrogen, alkyl, or aryl group with a halogenating agent under conditions such that a halogen atom is added at the 6 carbon atom to form a halogenated phenol;
contacting the halogenated phenol with a halo-di(aryl or alkyl) phosphine in the presents of an alkyl lithium under conditions to replace the halogen on the phenol with di(alkyl or aryl) phosphate to form a dialkyl or diaryl phosphate substituted phenol; and
contacting the dialkyl or diaryl phosphate substituted phenol with a diamine, an ortho phenylene amine or ortho cyclohexyl diamine in the presence of bromine and a trialkyl amine to form a compound according to the formulas.

Embodiment 6. The method according to Embodiment 3 or 4 comprising preparing one of the compounds according to one of the formulas:

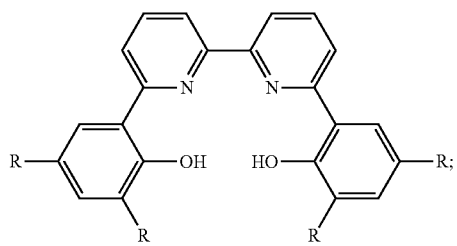

by:
contacting a phenol which may optionally be substituted at the 4 position with an hydrogen, alkyl, or aryl group with a halogenating agent and silyl halide under conditions such that a halogen atom is added at the 2 and 6 carbon atoms of the aromatic ring and the 1 hydroxyl group is converted to silyl ether group which may optionally be substituted at the 4 position with an hydrogen, alkyl, or aryl group;

contacting the formed 2, 6-halogenated 1-silylether substituted benzene with an alkyl lithium compound and dimethylformamide to form a phenol having a silyl and an acetaldehyde group at the 2 and 6 positions which may optionally be substituted at the 4 position with an hydrogen, alkyl, or aryl group; and contacting the phenol having a silyl and an acetaldehyde group at the 2 and 6 positions which may optionally be substituted at the 4 position with an hydrogen, alkyl, or aryl group with one of o-phenylene diamine, ethylene diamine, or cyclohexanediamine and optionally in the presence of a Lewis acid or Bronsted acid catalyst and an alkali metal or ammonium salt to form one of the compounds corresponding to one of the formulas.

Embodiment 8. The method of embodiment 5, wherein contacting the dialkyl or diaryl phosphate substituted phenol with the diamine, the ortho phenylene amine or the ortho cyclohexyl diamine in the presence of the bromine and the trialkyl amine to form a compound according to the formulas includes:

contacting the dialkyl or diaryl phosphate substituted phenol with the bromine to form an activated dialkyl or diaryl phosphate substituted phenol; and contacting the activated dialkyl or diaryl phosphate substituted phenol with the ortho phenylene amine or the ortho cyclohexyl diamine in the presence of the trialkyl amine to form the compound according to the formulas.

Embodiment 9. The method of embodiments 5 or 8, wherein the halo-di(aryl or alkyl) phosphine is one or more of chloro-di(aryl) phosphine, chloro-di(alkyl) phosphine, chloro-di(alkoxide) phosphine, or any combination.

Embodiment 10. The method of any one of embodiments 5 or 8-9, wherein the trialkyl amine is configured to consume bromic acid to form an ammonium salt.

Embodiment 11. The method of any one of embodiments 5 or 8-10, wherein the trialkyl amine includes one or more of tibutylamine.

Embodiment 12. The method of embodiment 6, wherein contacting the formed halogenated phenol with the trialkyl borate in the presence of an alkyl lithium compound to replace the halogen atom with a boron dihydroxide group:

contacting the phenol containing a boron dihydroxide group with hydrochloric acid to quench the reaction.

Embodiment 13. The method of embodiments 6 or 12, wherein the trialkyl borate includes one or more of trimethyl borate, triethyl borate, tripropyl borate, trisiopropyl borate, or any combination thereof.

Embodiment 14. The method of any one of embodiments 6, 12, or 13, wherein the alkali metal carbonate includes sodium carbonate.

Embodiment 15. The method of embodiment 7, wherein contacting a phenol which may optionally be substituted at the 4 position with an hydrogen, alkyl, or aryl group with a halogenating agent and silyl halide under conditions such that a halogen atom is added at the 2 and 6 carbon atoms of the aromatic ring and the 1 hydroxyl group is converted to silyl ether group which may optionally be substituted at the 4 position with an hydrogen, alkyl, or aryl group includes:

contacting the phenol which may optionally be substituted with the halogenating agent to form a halogenated phenol; and contacting the halogenated phenol with the silyl halide under conditions such that 1 hydroxyl group is converted to silyl ether group which may optionally be substituted at the 4 position with an hydrogen, alkyl, or aryl group.

Embodiment 16. The method of embodiments 7 or 15, wherein contacting the halogenated phenol with the silyl halide under conditions such that 1 hydroxyl group is converted to silyl ether group which may optionally be substituted at the 4 position with an hydrogen, alkyl, or aryl group includes:

contacting the halogenated phenol and the silyl halide with a tertiary amine to consume any acid byproduct so that the phenol having a silyl and an acetaldehyde group at the 2 and 6 positions which may optionally be substituted at the 4 position with an hydrogen, alkyl, or aryl group is formed.

Embodiment 17. The method of any one of embodiments 7 or 15-16, wherein contacting the formed 2, 6-halogenated 1-silylether substituted benzene with the alkyl lithium compound to form the phenol having the silyl and the acetaldehyde group at the 2 and 6 positions which may optionally be substituted at the 4 position with an hydrogen, alkyl, or aryl group includes:

contacting the formed 2, 6-halogenated 1-silylether substituted benzene with the alkyl lithium compound to form the phenol having the silyl at the 2 or 6 position; and contacting the phenol having the silyl at the 2 or the 6 position with dimethylformamide to form the phenol having the silyl and the acetaldehyde group at the 2 and 6 positions which may optionally be substituted at the 4 position with an hydrogen, alkyl, or aryl group.

Embodiment 18. The method of any one of embodiments 7 or 15-17, wherein the silyl halide is trisubstituted with one or more of aryl groups, alkyl groups, or both.

Embodiment 19. The method of any one of embodiments 7 or 15-19, wherein the silyl halide includes one or more of fluorine, chlorine, bromine, iodine, or any combination thereof.

Embodiment 20. The method of any one of the preceding embodiments, wherein contacting the formed compounds with the metal carbonyl under condition such that one of the compounds are formed includes:

contacting the formed compounds, the metal carbonyl, or both with a polar ligand so that that one of the compounds are formed.

Embodiment 21. The method of any one of the preceding embodiments, wherein the alkyl lithium compound includes one or more of n-butyllithium, t-butyllithium, or any combination thereof.

Embodiment 22. The method of any one of the preceding embodiments, wherein the halogenating agent includes one or more of bromine, N-bromosuccinimde, dibromoisocyanuric acid, or any combination thereof.

Embodiment 23. The method of any one of the preceding embodiments, wherein the metal carbonyl includes NaCo$(CO)_4$, $CO_2(CO)_8$, $HCo(CO)_4$, or any combination thereof.

Embodiment 24. The method of any one of the preceding embodiments, wherein the polar ligand includes one or more of tetrahydrofuran, diethyl ether, or any combination thereof.

Embodiment 25. The method of any one of the preceding embodiments, wherein metalating agent is one or more of $(Et)_2AlCl$, $(Et)_3Al$, $CrCl_2$, or any combination thereof

EXAMPLES

The following examples are provided to illustrate the invention but are not intended to limit the scope thereof. All parts and percentages are by weight unless otherwise indicated.

The NMR analysis is conducted on a Bruker Advance III-HD spectrometer operating at 400.3 MHz. The sample is dissolved in THF-d8 before testing.

The in-situ-FTIR analysis tracking the catalytic activity of the regenerated catalyst is conducted on a Mettler Toledo ReatIR 45m equipped with a silicone tipped sentinel that is directly affixed to the bottom of the reactor.

Figure 4:
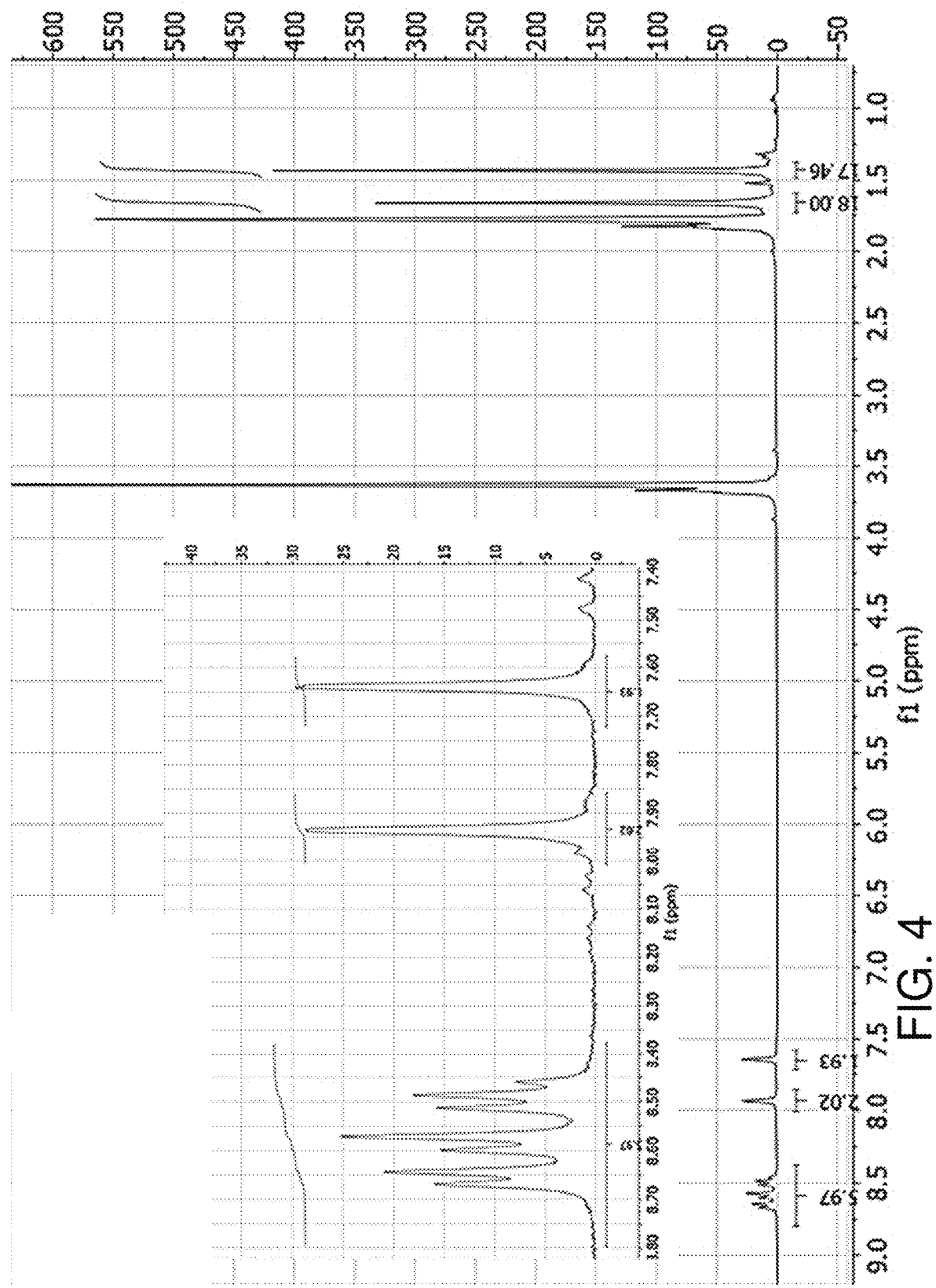
FIG. 4 is a 1H NMR spectrum of the isolated carbonylation catalyst with a Lewis acid containing a $^R$dhbpy(H)$_2$ ligand.

FIG. 4 is a 1H NMR spectrum of the isolated carbonylation catalyst with a Lewis acid containing a bipyridine or phenanthroline ligand. This shows the desired catalyst from the $^{tbu}$dhbpy(H)$_2$ ligand metalated with Et$_2$AlCl and reacted with NaCo(CO)$_4$ that is successfully isolated. The inlet image is a zoomed in view of the aromatic region of $^{tbu}$dhbpy(H)$_2$ ligand metalated with Et$_2$AlCl.

Figure 5:
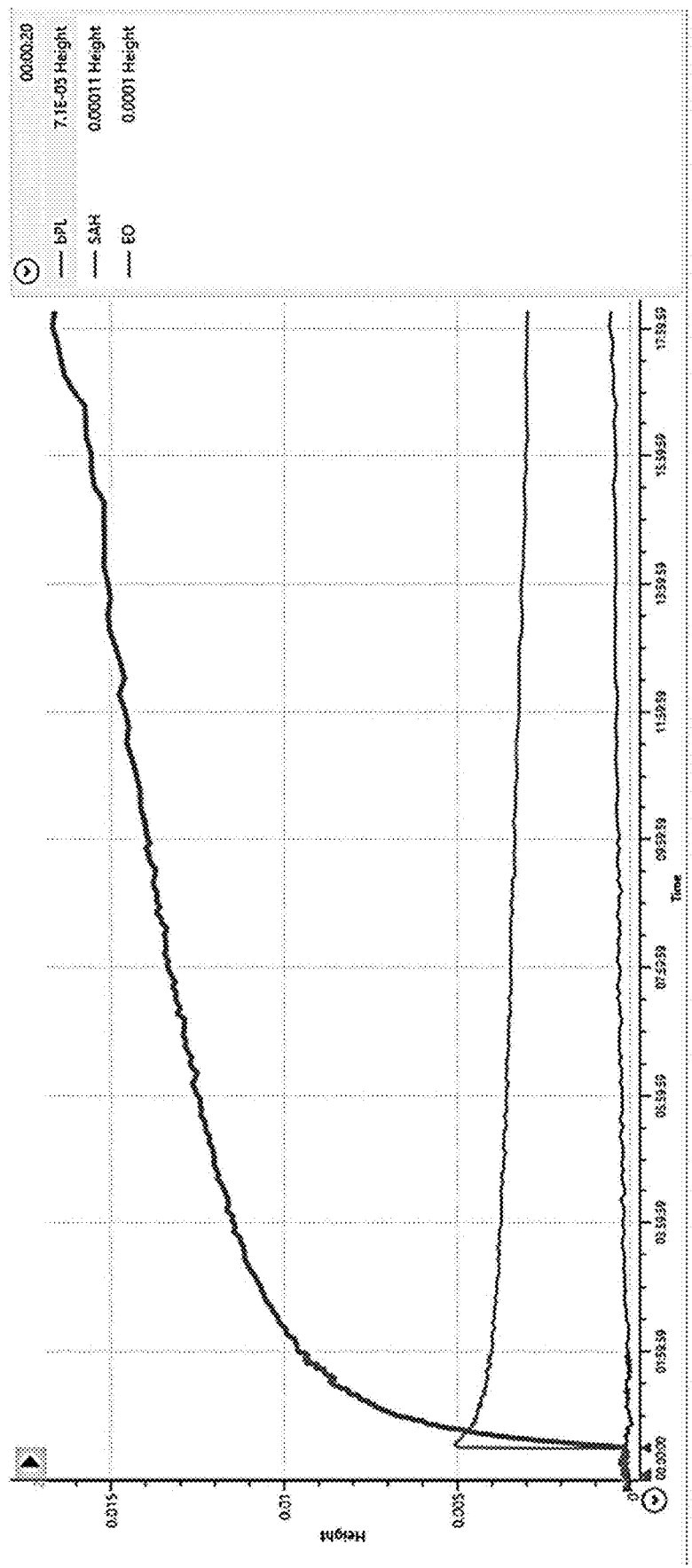
FIG. 5 is a ReactIR spectrum showing the in-situ monitoring of beta-propiolactone (bPL) formation from the carbonylation catalyst with a Lewis acid containing a pyridine or phenanthroline ligand.

FIG. 5 is a ReactIR spectrum showing the in-situ monitoring of beta-propiolactone (BPL) formation from the carbonylation catalyst with a Lewis acid containing a pyridine or phenanthroline ligand. The carbonylation catalyst is shown to have good catalytic activity with BPL (top line), some catalytic activity with ethylene oxide (middle line), and minimal activity with succinic anhydride (bottom line).

What is claimed:

1. A compound according to one of a following formulas:

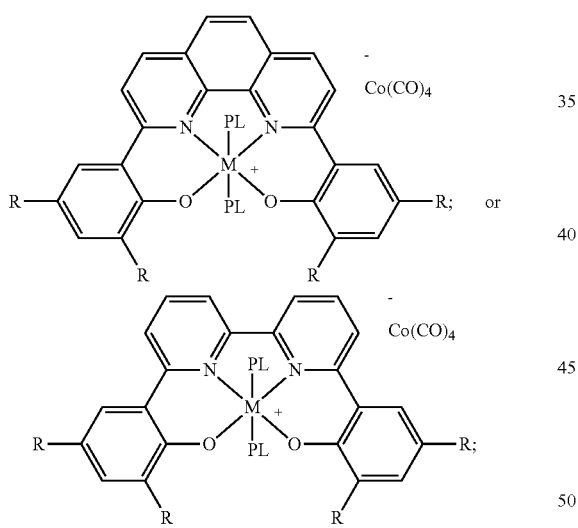

wherein R is separately in each occurrence hydrogen, alkyl, or aryl group;
PL is selected from a group consisting of tetrahydrofuran, dioxane, diethyl ether, acetonitrile, carbon disulfide, pyridine, epoxide, ester, lactone, or a combination thereof; and
M is separately in each occurrence aluminum and chromium.

2. The compound according to claim 1 wherein:
R is separately in each occurrence an alkyl or aryl group; and
PL is selected from a group consisting of, dioxane, diethyl ether, or a combination thereof.

3. A method for preparing a compound according to claim 1 comprising:

contacting of a compound according to one of a formulas:

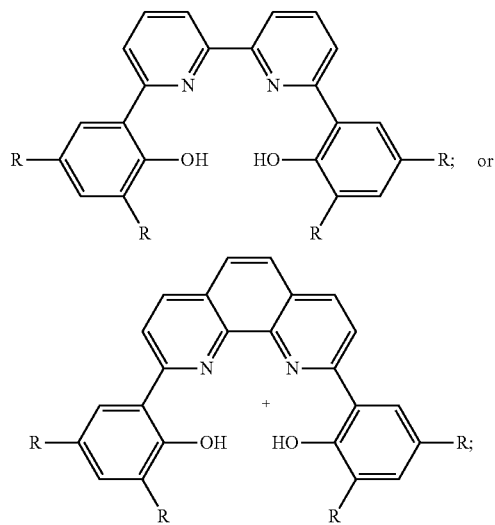

with a metalating agent to form one of the compounds according to a formula of:

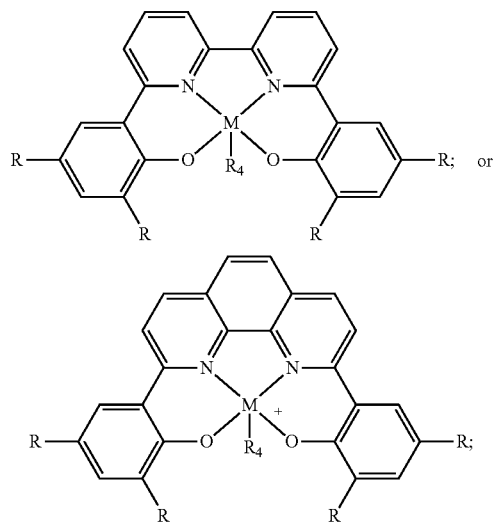

and contacting the formed compounds with a metal carbonyl under condition such that one of the following compounds are formed:

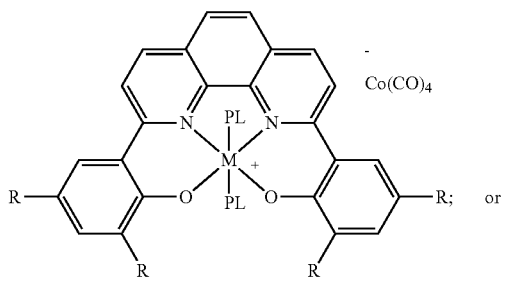

-continued

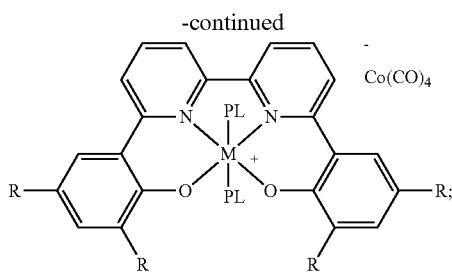

wherein R is separately in each occurrence hydrogen, alkyl, or aryl group;

PL is selected from a group consisting of tetrahydrofuran, dioxane, diethyl ether, acetonitrile, carbon disulfide, pyridine, epoxide, ester, lactone, or a combination thereof; and M is separately in each occurrence aluminum or chromium.

4. The method according to claim 3 wherein:

R is separately in each occurrence an alkyl or aryl group; and

PL is selected from a group consisting of tetrahydrofuran, dioxane, diethyl ether, or a combination thereof.

5. The method according to claim 3 comprising preparing one of the compounds according to one of the formulas:

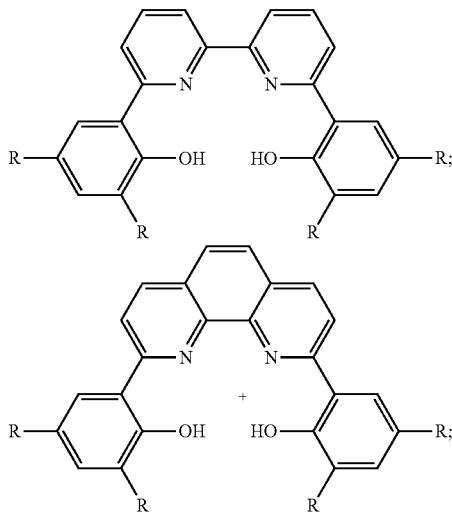

by:
contacting a phenol which may be substituted at a 2 and/or 4 position with hydrogen, alkyl, or aryl group with a halogenating agent under conditions such that a halogen atom is added at a 6 carbon atom to form a halogenated phenol;

contacting the formed halogenated phenol with a trialkyl borate in presence of an alkyl lithium compound to replace the halogen atom with a boron dihydroxide group; and contacting phenol containing a boron dihydroxide group with bipyridine or phenanthroline having halogen groups on carbons adjacent to nitrogen atoms in the presence of a palladium catalyst and an alkali metal carbonate under conditions to form one of the compounds of the formulas.

6. The method of claim 5, wherein contacting the formed halogenated phenol with the trialkyl borate in the presence of an alkyl lithium compound to replace the halogen atom with a boron dihydroxide group further comprises:

contacting the phenol containing a boron dihydroxide group with hydrochloric acid to quench a reaction.

7. The method of claim 5, wherein the trialkyl borate selected from a group consisting of trimethyl borate, triethyl borate, tripropyl borate, trisiopropyl borate, or any combination thereof.

8. The method of claim 5, wherein the alkali metal carbonate is sodium carbonate.

9. The method of claim 5, wherein contacting the formed compounds with the metal carbonyl under condition such that one of the compounds are formed includes:

contacting the formed compounds, the metal carbonyl, or both with a polar ligand so that that one of the compounds are formed.

10. The method of claim 5, wherein the alkyl lithium compound is selected from a group consisting of one or more of n-butyllithium, t-butyllithium, or any combination thereof.

11. The method of claim 5, wherein the halogenating agent is selected from a group consisting of one or more of bromine, N-bromosuccinimde, dibromoisocyanuric acid, or any combination thereof.

12. The method of claim 5, wherein the metal carbonyl is selected from a group consisting of $NaCo(CO)_4$, $Co_2(CO)_8$, $HCo(CO)_4$, or any combination thereof.

13. The method of claim 5, wherein the PL is selected from a group consisting of one or more of tetrahydrofuran, diethyl ether, or any combination thereof.

14. The method of claim 5, wherein the metalating agent is selected from a group consisting of one or more of $(Et)_2AlCl$, $(Et)_3Al$, $CrCl_2$, or any combination thereof.

15. The compound of claim 1, wherein the PL is selected from a group consisting of the tetrahydrofuran.

16. The method of claim 5, wherein the PL is selected from a group consisting of of the tetrahydrofuran.

* * * * *